US012794170B2

(12) United States Patent
Raney et al.

(10) Patent No.: US 12,794,170 B2
(45) Date of Patent: Nov. 10, 2026

(54) SHIELDED JACK FLANGE TERMINATION

(71) Applicant: Leviton Manufacturing Co., Inc., Melville, NY (US)

(72) Inventors: Jackson William Raney, Bothell, WA (US); John Walbridge, Lynnwood, WA (US); Charles Bragg, Bothell, WA (US); Dean Lipke, Mill Creek, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 234 days.

(21) Appl. No.: 18/760,986

(22) Filed: Jul. 1, 2024

(65) Prior Publication Data

US 2025/0233349 A1 Jul. 17, 2025

Related U.S. Application Data

(63) Continuation-in-part of application No. 18/414,963, filed on Jan. 17, 2024.

(51) Int. Cl.
*H01R 13/514* (2006.01)
*H01R 13/639* (2006.01)
*H01R 13/6591* (2011.01)

(52) U.S. Cl.
CPC ......... *H01R 13/514* (2013.01); *H01R 13/639* (2013.01); *H01R 13/65915* (2020.08)

(58) Field of Classification Search
CPC ...... H01R 9/031; H01R 9/2416; H01R 24/64; H01R 13/514; H01R 13/639; H01R 13/65915; H01R 13/6592
See application file for complete search history.

(56) References Cited

U.S. PATENT DOCUMENTS 3,636,500 A 1/1972 Sedlacek
3,763,461 A 10/1973 Kotski
3,830,957 A 8/1974 Oberdiear
(Continued)

FOREIGN PATENT DOCUMENTS

CN 101142757 3/2008
DE 102004004229 3/2006
(Continued)

OTHER PUBLICATIONS

Ex Parte Quayle Action received for U.S. Appl. No. 29/954,510 dated Sep. 30, 2025, 6 pages.
(Continued)

*Primary Examiner* — Abdullah A Riyami
*Assistant Examiner* — Nader J Alhawamdeh
(74) *Attorney, Agent, or Firm* — Amin, Turocy & Watson, LLP

(57) ABSTRACT

A data cable jack assembly comprises features that ensure secure connectivity between a data cable's drain wire and the assembly's metal door, as well as features that promote consistent and organized termination of the cable's insulated conductors. The assembly includes a wire management component through which is formed a cable reception hole surrounded by a collar on one side of the component. The jack assembly's door includes a flange around which the cable's drain wire can be wound, thus establishing a robust electrical connection between the drain wire and the metal jack door.

20 Claims, 29 Drawing Sheets

(56) References Cited

U.S. PATENT DOCUMENTS

| | | | |
|---|---|---|---|
| 3,845,455 | A | 10/1974 | Shoemaker |
| 3,975,076 | A | 8/1976 | Shida |
| 4,284,316 | A | 8/1981 | Debaigt |
| 4,444,447 | A | 4/1984 | Markwardt |
| 4,552,429 | A | 11/1985 | van Alst |
| 4,682,835 | A | 7/1987 | Aujla |
| 4,747,785 | A | 5/1988 | Roberts |
| 4,749,366 | A | 6/1988 | McCaffery |
| 4,764,124 | A | 8/1988 | Simon |
| 4,790,765 | A | 12/1988 | Ehrenfels |
| 4,810,210 | A | 3/1989 | Komatsu |
| 4,830,628 | A | 5/1989 | Dyson |
| 4,838,811 | A | 6/1989 | Nakamura |
| 4,842,553 | A | 6/1989 | Ingram |
| 4,847,711 | A | 7/1989 | Inoue |
| 4,857,015 | A | 8/1989 | Michaels |
| 4,870,227 | A | 9/1989 | Saen |
| 4,897,040 | A | 1/1990 | Gerke |
| 4,909,754 | A | 3/1990 | Paradis |
| 4,973,258 | A | 11/1990 | Fusselman |
| 4,973,261 | A | 11/1990 | Hatagishi |
| 4,975,078 | A | 12/1990 | Stroede |
| 5,021,610 | A | 6/1991 | Roberts |
| 5,131,863 | A | 7/1992 | Gerke |
| 5,147,215 | A | 9/1992 | Pritulsky |
| 5,169,346 | A | 12/1992 | Johnston |
| 5,228,872 | A | 7/1993 | Liu |
| 5,230,632 | A | 7/1993 | Baumberger |
| 5,278,352 | A | 1/1994 | Schade |
| 5,281,176 | A | 1/1994 | Yahagi |
| 5,310,359 | A | 5/1994 | Chadbourne |
| 5,372,513 | A | 12/1994 | Rodrigues |
| 5,445,538 | A | 8/1995 | Rodrigues |
| 5,501,607 | A | 3/1996 | Yoshioka |
| 5,514,007 | A | 5/1996 | Rodrigues |
| 5,518,423 | A | 5/1996 | Green |
| 5,533,910 | A | 7/1996 | Korner |
| 5,547,405 | A | 8/1996 | Pinney |
| D379,177 | S | 5/1997 | Chu |
| 5,653,609 | A | 8/1997 | Orstad |
| 5,769,647 | A | 6/1998 | Tulley |
| D397,323 | S | 8/1998 | Tulley et al. |
| 5,836,782 | A | 11/1998 | Odley |
| 5,848,911 | A | 12/1998 | Garcin |
| 5,885,111 | A | 3/1999 | Yu |
| 5,947,761 | A | 9/1999 | Pepe |
| 6,010,353 | A | 1/2000 | Ensz |
| 6,056,586 | A | 5/2000 | Lin |
| 6,077,122 | A | 6/2000 | Elkhatib |
| 6,109,954 | A | 8/2000 | Lin |
| 6,142,817 | A | 11/2000 | Lee |
| 6,142,828 | A | 11/2000 | Pepe |
| 6,193,554 | B1 | 2/2001 | Wu |
| 6,224,423 | B1 | 5/2001 | Yip |
| 6,238,231 | B1 | 5/2001 | Chapman |
| 6,254,403 | B1 | 7/2001 | Bernardini |
| 6,254,420 | B1 | 7/2001 | Letailleur |
| 6,267,617 | B1 | 7/2001 | Nozick |
| 6,287,149 | B1 | 9/2001 | Elkhatib |
| 6,305,955 | B1 | 10/2001 | Billman |
| 6,315,596 | B1 | 11/2001 | Chen |
| 6,338,655 | B1 | 1/2002 | Masse |
| 6,347,961 | B2 | 2/2002 | Zhu |
| 6,354,851 | B1 | 3/2002 | Bachle |
| 6,364,707 | B1 | 4/2002 | Wang |
| 6,368,122 | B2 | 4/2002 | Billman |
| 6,371,793 | B1 | 4/2002 | Doorhy |
| 6,379,157 | B1 | 4/2002 | Curry |
| 6,419,510 | B2 | 7/2002 | Shiraki |
| 6,431,903 | B1 | 8/2002 | Dittmann |
| 6,488,525 | B2 | 12/2002 | Abel |
| 6,520,781 | B2 | 2/2003 | Koide |
| 6,520,808 | B2 | 2/2003 | Forbes |
| 6,537,104 | B1 | 3/2003 | Hagmann |
| 6,559,649 | B2 | 5/2003 | Deleu |
| 6,565,375 | B1 | 5/2003 | Daoud |
| 6,582,248 | B2 | 6/2003 | Bachman |
| 6,592,396 | B2 | 7/2003 | Pepe |
| 6,595,696 | B1 | 7/2003 | Zellak |
| 6,726,492 | B1 | 4/2004 | Yu |
| RE38,519 | E | 5/2004 | Doorhy et al. |
| 6,746,283 | B2 | 6/2004 | Arnett |
| 6,749,456 | B1 | 6/2004 | Conner |
| 6,752,647 | B1 | 6/2004 | Lin |
| 6,764,222 | B1 | 7/2004 | Szilagyi |
| 6,767,241 | B1 | 7/2004 | Abel |
| 6,783,386 | B2 | 8/2004 | Clement |
| 6,786,776 | B2 | 9/2004 | Itano |
| 6,796,806 | B2 | 9/2004 | Boutros |
| 6,799,989 | B2 | 10/2004 | Doorhy |
| 6,830,488 | B2 | 12/2004 | Bush |
| 6,869,297 | B2 | 3/2005 | Caveney |
| 6,872,090 | B2 | 3/2005 | Martin |
| 6,923,673 | B2 | 8/2005 | Doorhy |
| 6,953,362 | B2 | 10/2005 | Mossner |
| 6,957,970 | B2 | 10/2005 | Weigel |
| 6,964,587 | B2 | 11/2005 | Colantuono |
| 7,025,621 | B2 | 4/2006 | Mössner |
| 7,033,219 | B2 | 4/2006 | Gordon |
| 7,048,590 | B2 | 5/2006 | Colantuono |
| 7,077,670 | B2 | 7/2006 | Suwa |
| 7,083,472 | B2 | 8/2006 | Gordon |
| 7,086,878 | B2 | 8/2006 | Mine |
| 7,086,909 | B2 | 8/2006 | Colantuono |
| 7,103,968 | B2 | 9/2006 | Karrasch |
| 7,114,985 | B2 | 10/2006 | Doorhy |
| 7,114,987 | B2 | 10/2006 | Nad |
| 7,150,657 | B2 | 12/2006 | Quenneville |
| 7,179,131 | B2 | 2/2007 | Caveney |
| 7,182,649 | B2 | 2/2007 | Caveney |
| 7,195,518 | B2 | 3/2007 | Bert |
| 7,201,618 | B2 | 4/2007 | Ellis |
| 7,220,149 | B2 | 5/2007 | Pharney |
| 7,223,112 | B2 | 5/2007 | Abughazaleh |
| 7,249,962 | B2 | 7/2007 | Milette et al. |
| 7,249,974 | B2 | 7/2007 | Gordon |
| 7,252,554 | B2 | 8/2007 | Caveney |
| 7,255,587 | B2 | 8/2007 | Boeck et al. |
| 7,294,012 | B2 | 11/2007 | AbuGhazaleh |
| 7,306,479 | B1 | 12/2007 | Wu |
| 7,332,678 | B2 | 2/2008 | Pyron |
| D565,443 | S | 4/2008 | Frake |
| 7,384,298 | B2 | 6/2008 | Caveney |
| 7,396,999 | B2 | 7/2008 | Miller |
| 7,404,739 | B2 | 7/2008 | Sheilds |
| 7,413,464 | B1 | 8/2008 | Chen |
| 7,416,448 | B2 | 8/2008 | Gaidosch |
| 7,432,452 | B2 | 10/2008 | Gardner |
| 7,438,567 | B2 | 10/2008 | Nalwad |
| 7,438,583 | B2 | 10/2008 | AbuGhazaleh |
| 7,448,920 | B2 | 11/2008 | Quenneville |
| 7,452,245 | B2 | 11/2008 | Doorhy |
| 7,452,246 | B2 | 11/2008 | Caveney |
| 7,476,120 | B2 | 1/2009 | Patel |
| 7,481,678 | B2 | 1/2009 | Aekins |
| D587,201 | S | 2/2009 | Allwood |
| 7,485,010 | B2 | 2/2009 | Aekins |
| 7,563,125 | B2 | 7/2009 | Pepe |
| 7,568,937 | B2 | 8/2009 | Fitzpatrick |
| 7,575,482 | B1 | 8/2009 | Pepe |
| 7,578,695 | B2 | 8/2009 | Boeck |
| 7,579,556 | B2 | 8/2009 | Tapper |
| 7,597,568 | B1 | 10/2009 | Lu |
| 7,604,515 | B2 | 10/2009 | Siemon |
| 7,605,707 | B2 | 10/2009 | German |
| D603,341 | S | 11/2009 | Kawakami |
| 7,615,714 | B2 | 11/2009 | Pyron |
| 7,621,772 | B1 | 11/2009 | Tobey |
| D606,493 | S | 12/2009 | Yuan |
| 7,637,769 | B2 | 12/2009 | Garcia |
| 7,658,648 | B2 | 2/2010 | Aekins |
| 7,670,193 | B2 | 3/2010 | Milette |
| 7,686,642 | B2 | 3/2010 | Pearson |
| 7,686,643 | B2 | 3/2010 | Pepe |

(56) References Cited

U.S. PATENT DOCUMENTS

| | | | |
|---|---|---|---|
| 7,704,093 B2 | 4/2010 | Turkekole | |
| 7,713,094 B1 | 5/2010 | Sparrowhawk | |
| 7,726,018 B2 | 6/2010 | Caveney | |
| 7,731,542 B2 | 6/2010 | Doorhy | |
| 7,736,173 B2 | 6/2010 | Chen | |
| 7,736,195 B1 | 6/2010 | Poulsen | |
| 7,758,383 B1 * | 7/2010 | Chantrell ......... | H01R 13/65915 439/607.41 |
| 7,766,688 B2 | 8/2010 | Ferrus | |
| RE41,699 E | 9/2010 | Itano | |
| 7,821,370 B1 | 10/2010 | Shu | |
| 7,823,281 B2 | 11/2010 | Caveney | |
| 7,824,231 B2 | 11/2010 | Marti | |
| 7,854,624 B1 | 12/2010 | Pepe | |
| 7,857,655 B2 | 12/2010 | Gyagang | |
| 7,857,663 B2 | 12/2010 | Chantrell | |
| 7,871,285 B1 | 1/2011 | Tobey | |
| 7,874,865 B2 | 1/2011 | Tobey | |
| 7,874,879 B2 | 1/2011 | Caveney | |
| D631,844 S | 2/2011 | Su et al. | |
| D632,251 S | 2/2011 | Chen | |
| 7,878,855 B2 | 2/2011 | Li | |
| 7,883,372 B1 | 2/2011 | Sun | |
| 7,887,370 B2 | 2/2011 | Chen | |
| 7,892,018 B1 | 2/2011 | Tobey | |
| 7,892,027 B2 | 2/2011 | Mao | |
| 7,892,028 B2 | 2/2011 | Wu | |
| 7,905,015 B2 | 3/2011 | Quenneville | |
| 7,909,622 B2 | 3/2011 | Pepe | |
| 7,909,647 B2 | 3/2011 | Kawaguchi | |
| 7,909,656 B1 | 3/2011 | Erickson | |
| 7,914,328 B2 | 3/2011 | Tanaka | |
| 7,922,515 B2 | 4/2011 | Fitzpatrick | |
| 7,955,120 B2 | 6/2011 | Patel | |
| 7,967,645 B2 | 6/2011 | Marti | |
| 7,972,150 B1 | 7/2011 | Lin | |
| 7,976,334 B2 | 7/2011 | Bishop | |
| 8,038,482 B2 | 10/2011 | Erickson | |
| 8,043,125 B2 | 10/2011 | Doorhy | |
| 8,057,249 B1 | 11/2011 | Tobey | |
| D649,971 S | 12/2011 | Lyford | |
| 8,070,506 B2 | 12/2011 | Martin | |
| 8,100,705 B2 | 1/2012 | Chen | |
| 8,109,784 B2 | 2/2012 | Patel | |
| 8,128,436 B2 | 3/2012 | Bopp | |
| 8,137,141 B2 | 3/2012 | Straka | |
| 8,167,662 B2 | 5/2012 | Milette | |
| 8,198,536 B2 | 6/2012 | Clark | |
| D663,273 S | 7/2012 | Lyford | |
| 8,216,002 B2 | 7/2012 | Doorhy | |
| 8,262,415 B2 | 9/2012 | Caveney | |
| 8,267,714 B2 | 9/2012 | Siemon et al. | |
| D668,226 S | 10/2012 | Lyford | |
| 8,298,000 B2 | 10/2012 | Patel | |
| 8,333,607 B1 * | 12/2012 | Moldoch .............. | H01R 4/2433 439/367 |
| 8,342,877 B2 | 1/2013 | Bruijn | |
| 8,353,711 B2 | 1/2013 | Huang | |
| 8,376,779 B2 | 2/2013 | Metral | |
| 8,425,255 B2 | 4/2013 | Erickson | |
| 8,475,201 B2 | 7/2013 | Pirlo | |
| 8,550,850 B2 | 10/2013 | Caveney | |
| D694,191 S | 11/2013 | Lien et al. | |
| 8,632,362 B2 | 1/2014 | Straka | |
| 8,650,750 B2 | 2/2014 | Engels | |
| 8,657,626 B2 | 2/2014 | Duval | |
| 8,672,705 B2 | 3/2014 | Schneider | |
| 8,690,459 B2 | 4/2014 | Lin | |
| 8,715,013 B2 | 5/2014 | Caveney | |
| 8,747,126 B2 | 6/2014 | Corbett | |
| 8,764,465 B2 | 7/2014 | Huang | |
| 8,777,656 B2 | 7/2014 | Kuo | |
| D714,293 S | 9/2014 | Kelly | |
| 8,826,532 B2 | 9/2014 | Caveney | |
| 8,834,196 B2 | 9/2014 | Duran | |
| 8,834,207 B2 | 9/2014 | Caveney | |
| 8,900,015 B2 | 12/2014 | Yuan et al. | |
| D721,036 S | 1/2015 | Kreitzer | |
| 8,944,842 B2 | 2/2015 | Lu | |
| 8,968,035 B2 | 3/2015 | Hashim | |
| 8,979,588 B2 | 3/2015 | Straka | |
| 8,979,592 B2 | 3/2015 | Dang | |
| 8,997,345 B2 | 4/2015 | Liu | |
| 9,011,181 B2 | 4/2015 | Caveney | |
| D729,806 S | 5/2015 | Park | |
| 9,022,792 B2 | 5/2015 | Sticker | |
| D731,489 S | 6/2015 | Langhammer | |
| D732,536 S | 6/2015 | Kang | |
| D733,142 S | 6/2015 | Solomon | |
| 9,147,977 B2 | 9/2015 | Poulsen | |
| D743,398 S | 11/2015 | Smith | |
| D745,523 S | 12/2015 | Magi | |
| D746,291 S | 12/2015 | Solomon | |
| 9,251,930 B1 | 2/2016 | McNutt | |
| 9,257,805 B2 | 2/2016 | Wang | |
| D752,590 S | 3/2016 | Bragg | |
| 9,281,611 B2 | 3/2016 | Glick | |
| 9,281,620 B2 | 3/2016 | Yuan et al. | |
| 9,287,635 B2 | 3/2016 | Caveney | |
| 9,306,315 B2 | 4/2016 | Scholten | |
| 9,331,431 B2 | 5/2016 | Straka | |
| 9,337,572 B2 | 5/2016 | Maranto et al. | |
| 9,343,822 B2 | 5/2016 | Sparrowhawk | |
| 9,379,488 B2 | 6/2016 | Schneider | |
| 9,407,044 B2 | 8/2016 | Caveney | |
| 9,450,326 B2 | 9/2016 | Engels et al. | |
| 9,484,671 B2 | 11/2016 | Zhu | |
| 9,496,644 B2 | 11/2016 | Bragg | |
| 9,515,437 B2 | 12/2016 | Bragg et al. | |
| 9,531,128 B2 | 12/2016 | Caveney | |
| 9,627,827 B2 | 4/2017 | Bragg | |
| 9,722,370 B2 | 8/2017 | Caveney | |
| 9,847,607 B2 | 12/2017 | Bopp | |
| 9,859,663 B2 | 1/2018 | Sparrowhawk | |
| 9,865,960 B2 | 1/2018 | Fontaine et al. | |
| 9,865,975 B2 | 1/2018 | Plamondon et al. | |
| D818,469 S | 5/2018 | Bragg | |
| D820,215 S | 6/2018 | Kobayashi | |
| 9,991,638 B2 | 6/2018 | Straka | |
| 9,991,653 B2 | 6/2018 | Caveney | |
| 10,122,135 B2 | 11/2018 | Trio | |
| 10,135,207 B2 | 11/2018 | Cui et al. | |
| D839,198 S | 1/2019 | Chadbourne | |
| 10,181,678 B2 | 1/2019 | Pemwieser | |
| 10,186,797 B2 | 1/2019 | Fontaine et al. | |
| D841,653 S | 2/2019 | Lin | |
| D848,430 S | 5/2019 | Bragg | |
| D852,796 S | 7/2019 | Liu | |
| 10,439,352 B2 | 10/2019 | Cheng et al. | |
| 10,476,197 B2 | 11/2019 | Fontaine et al. | |
| 10,476,212 B2 | 11/2019 | Bopp et al. | |
| 10,522,939 B2 | 12/2019 | De Dios Martin | |
| D879,719 S | 3/2020 | Hu | |
| 10,594,088 B2 | 3/2020 | Cupples et al. | |
| 10,608,382 B2 | 3/2020 | Bopp et al. | |
| 10,651,608 B2 | 5/2020 | White | |
| D892,053 S | 8/2020 | Hu | |
| 10,777,953 B2 | 9/2020 | White et al. | |
| 10,784,640 B2 | 9/2020 | Font Aranega et al. | |
| D901,509 S | 11/2020 | Bragg et al. | |
| 10,897,101 B2 | 1/2021 | Fontaine et al. | |
| 10,958,018 B2 | 3/2021 | De Dios et al. | |
| 11,056,840 B2 | 7/2021 | Bopp et al. | |
| 11,108,204 B2 | 8/2021 | Cheng et al. | |
| 11,367,985 B2 | 6/2022 | White et al. | |
| D960,837 S | 8/2022 | Drasner et al. | |
| 11,476,622 B2 | 10/2022 | De Dios et al. | |
| 11,502,449 B2 | 11/2022 | Wang | |
| 11,509,105 B2 | 11/2022 | Font Aranega et al. | |
| 11,575,229 B2 | 2/2023 | Siev et al. | |
| D1,032,529 S | 6/2024 | Pan et al. | |
| D1,038,033 S | 8/2024 | Kjaer | |
| D1,049,828 S | 11/2024 | Jordan et al. | |
| D1,079,448 S | 6/2025 | Jiang | |

(56) References Cited

U.S. PATENT DOCUMENTS

| | | | | |
|---|---|---|---|---|
| D1,087,027 | S | 8/2025 | Benham | |
| D1,113,409 | S | 2/2026 | Wang | |
| D1,115,706 | S | 3/2026 | Ober-Woerder | |
| D1,118,324 | S | 3/2026 | Chen | |
| 2001/0049214 | A1 | 12/2001 | Billman | |
| 2002/0155746 | A1 | 10/2002 | Simpson | |
| 2004/0142589 | A1 | 7/2004 | Caveney | |
| 2005/0245125 | A1 | 11/2005 | Colantuono | |
| 2005/0277340 | A1 | 12/2005 | Gordon | |
| 2006/0030184 | A1 | 2/2006 | Sasaki | |
| 2006/0094273 | A1 | 5/2006 | Mine | |
| 2006/0205277 | A1 | 9/2006 | Gordon et al. | |
| 2006/0246784 | A1 | 11/2006 | Aekins | |
| 2007/0026736 | A1* | 2/2007 | Itano | H01R 13/518 439/607.55 |
| 2007/0032137 | A1* | 2/2007 | Caveney | H01R 13/5812 439/676 |
| 2007/0049079 | A1 | 3/2007 | Nalwad | |
| 2008/0105449 | A1 | 5/2008 | Kenny | |
| 2008/0311797 | A1 | 12/2008 | Aekins | |
| 2009/0017656 | A1 | 1/2009 | Lee | |
| 2009/0104821 | A1 | 4/2009 | Marti | |
| 2010/0009567 | A1 | 1/2010 | Gyagang | |
| 2010/0029122 | A1* | 2/2010 | Mateo Ferrus | H01R 13/5812 439/344 |
| 2010/0035471 | A1 | 2/2010 | Gaidosch | |
| 2010/0041527 | A1 | 2/2010 | Miller | |
| 2010/0206609 | A1 | 8/2010 | Glew | |
| 2011/0028026 | A1 | 2/2011 | Lu | |
| 2012/0015536 | A1 | 1/2012 | Huang | |
| 2012/0094525 | A1 | 4/2012 | Maranto et al. | |
| 2012/0184118 | A1 | 7/2012 | Lee | |
| 2012/0202389 | A1 | 8/2012 | Erickson | |
| 2013/0164967 | A1 | 6/2013 | Lu | |
| 2013/0248221 | A1 | 9/2013 | Booth | |
| 2013/0260581 | A1 | 10/2013 | Kuo | |
| 2014/0027362 | A1 | 1/2014 | Kent | |
| 2014/0057485 | A1* | 2/2014 | Huang | H01R 13/453 439/527 |
| 2014/0273626 | A1 | 9/2014 | Sparrowhawk | |
| 2015/0029535 | A1 | 1/2015 | Kondoh et al. | |
| 2015/0229078 | A1 | 8/2015 | Caveney | |
| 2015/0295350 | A1 | 10/2015 | Bragg | |
| 2016/0003617 | A1 | 1/2016 | Rocchi | |
| 2016/0036179 | A1 | 2/2016 | Bragg | |
| 2016/0172794 | A1 | 6/2016 | Sparrowhawk | |
| 2016/0240986 | A1* | 8/2016 | Bragg | H01R 13/4536 |
| 2017/0110833 | A1 | 4/2017 | Riley | |
| 2019/0190218 | A1* | 6/2019 | White | H01R 13/6592 |
| 2023/0170631 | A1 | 6/2023 | Wu | |
| 2025/0233329 | A1* | 7/2025 | Raney | H01R 9/031 |
| 2025/0233349 | A1* | 7/2025 | Raney | H01R 13/514 |
| 2025/0358549 | A1* | 11/2025 | Bragg | H02G 3/22 |

FOREIGN PATENT DOCUMENTS

| | | |
|---|---|---|
| EP | 0871243 | 7/2002 |
| EP | 1257011 | 11/2002 |
| EP | 1422793 | 5/2004 |
| EP | 1443608 | 8/2004 |
| EP | 1484824 | 12/2004 |
| EP | 1753093 | 2/2007 |
| EP | 1251601 | 1/2010 |
| EP | 2133957 B1 | 7/2012 |
| ES | 2583636 | 9/2016 |
| FR | 2982431 | 5/2013 |
| GB | 637004 | 5/1950 |
| GB | 2183405 | 10/1989 |
| GB | 2343558 | 5/2000 |
| JP | 2006318801 | 11/2006 |
| JP | 4039301 | 1/2008 |
| JP | 4492433 | 6/2010 |
| TW | I332734 | 11/2010 |
| TW | I415342 | 11/2013 |
| WO | 1996008855 | 3/1996 |
| WO | 2000051206 | 8/2000 |
| WO | 2005025007 | 3/2005 |
| WO | 2011087480 | 7/2011 |
| WO | 2013063233 | 5/2013 |
| WO | 2015056246 | 4/2015 |

OTHER PUBLICATIONS

"Leviton 61SJK-RG6 ATLAS-X1 Cat 6 Shielded Jack", Amazon.com, Online available at URL: https://www.amazon.com/Leviton-61SJK-RG6-Atlas-X1-Shielded-Jack/dp/B07VCYWN8D, Jul. 20, 2019, 1 page.

"Q Type Tooless Jack", Surtec https://www.surtec.com.tw/files/products/32458579-dddf-11ea-9eb8-000c29cf85fb/20220921_190005.jpg, 2022, 1 page.

International Search Report and Written Opinion received for PCT Application Serial No. PCT/US2025/011604 dated Apr. 22, 2025, 15 pages.

Communication pursuant to Article 94(3) EPC received for EP Patent Application Serial No. 24150876.1 dated Feb. 13, 2026, 13 pages.

Non-Final Office Action received for U.S. Appl. No. 18/414,963 dated Feb. 11, 2026, 9 pages.

Notice of Allowance received for U.S. Appl. No. 29/954,510 dated Jan. 14, 2026, 7 pages.

Non-Final Office Action received for U.S. Appl. No. 29/971,754 dated Mar. 26, 2026, 8 pages.

Non-Final Office Action received for U.S. Appl. No. 29/971,757 dated Mar. 26, 2026, 8 pages.

Lipke, et al. "Wire Manager and Jack" U.S. Appl. No. 29/971,754, filed Nov. 5, 2024, 16 pages.

Lipke, et al. "Wire Manager" U.S. Appl. No. 29/971,757, filed Nov. 5, 2024, 15 pages.

Cui, Wenbo, "High-Speed Data Communications Connector," U.S. Appl. No. 62/289,320, filed Jan. 31, 2016.

Extended European Search Report, dated Aug. 28, 2017, received in European Application No. 15 780 127.

Instruction Sheet 411-93007: Amp Netconnect: Amp Twist-6S SL Jack, Publication Date of Sep. 26, 2008.

Notice of Allowance dated Dec. 13, 2016, from U.S. Appl. No. 15/135,870, filed Apr. 22, 2016, now U.S. Pat. No. 9,627,827.

Notice of Allowance, dated Jun. 5, 2017, received in U.S. Appl. No. 15/052,630.

Office Action dated Apr. 13, 2016, from U.S. Appl. No. 14/685,379, filed Apr. 13, 2015, now U.S. Pat. No. 9,496,644.

Office Action dated Apr. 13, 2016, from U.S. Appl. No. 14/883,267, filed Oct. 14, 2015, now U.S. Pat. No. 9,515,437.

Office Action dated Apr. 26, 2017, from U.S. Appl. No. 15/341,933, filed Nov. 2, 2016, now U.S. Pat. No. 9,831,606.

Office Action dated Jul. 21, 2016, from U.S. Appl. No. 14/883,415, filed Oct. 14, 2015, now U.S. Pat. No. 9,608,379.

PCT International Search Report and Written Opinion in International application No. PCT/US2015/025621, dated Aug. 10, 2015.

PCT International Search Report and Written Opinion in International application No. PCT/US2016/056374, dated Jan. 24, 2017.

PCT International Search Report and Written Opinion in International application No. PCT/US2016/056499, dated Jan. 29, 2017.

PCT International Search Report and Written Opinion in International application No. PCT/US2017/015709, dated May 17, 2017.

Riley, J. C., "Communication Connector," U.S. Appl. No. 14/883,415, filed Oct. 14, 2015.

Sparrowhawk, B. L., "Communications Connector System," U.S. Appl. No. 15/052,630, filed Feb. 24, 2016.

Tyco Electronics "Amp Net Connect" Tyco Electronics, Feb. 22, 2005, 1 page.

Walbridge, et al. "Shielded Jack Flange Termination" U.S. Appl. No. 29/954,510, filed Jul. 26, 2024, 15 pages.

Notice of Allowance received for U.S. Appl. No. 18/414,963 dated Apr. 17, 2026, 10 pages.

* cited by examiner

SHIELDED JACK FLANGE TERMINATION

RELATED APPLICATIONS

The subject patent application is a continuation-in-part of U.S. patent application Ser. No. 18/414,963, filed Jan. 17, 2024, and entitled “SHIELDED JACK, DRAIN WIRE NOTCH AND BUMP DEFLECTION TERMINATION,” the entirety of which is hereby incorporated by reference herein.

TECHNICAL FIELD

The disclosed subject matter relates generally to data cable connectivity hardware such as data cable jacks, e.g., to a shield jack, a drain wire notch, and/or bump deflection termination

BACKGROUND

Category cable jacks are often used to terminate category cables and to interface those cables with other terminated cables that plug into the jacks. In some use cases, these jacks are mounted in patch panels or walls, and used to establish data connectivity between category cables terminated on the rear of the jack inside the patch panel or wall and category cables plugged into the jack’s front-facing aperture outside the patch panel or wall. To minimize electrical interference with the cable’s data signals and ensure error-free data transmission, particularly in high-density jack installations, the cable’s shielding should have a reliable connection to ground via, for instance, the cable’s drain wire.

The foregoing is merely intended to provide an overview of data jack design considerations relevant to the solutions described herein. Problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein provide a data jack assembly for category cables, such as a shielded twisted-pair cable. The assembly comprises a wire management component having physical features that simplify the process of terminating a data cable to the jack and aid in maintaining an organized routing of the cable’s insulated conductors. The wire management component comprises a base section through which a cable reception hole is formed. A collar is formed around a circumference of the cable reception hole on one side of the base section, and conductor organization and retention structures are formed on the opposite side of the base section. A data cable can be inserted through the cable reception hole via the first side of the base section and individual conductors of the cable can be organized and secured for termination on the opposite second side of the base section of the wire management component.

At least one slot is formed on the collar surrounding the cable reception hole, and a raised elongated bump is formed on the outer surface of the collar near the slot. A user can direct the cable’s drain wire through the slot such that the drain wire exits the collar through the slot, and then route the drain wire around the collar to a drain wire recess adjacent to the collar. This routing passes the drain wire over the elongated bump.

The jack assembly also includes a conductive metal jack door, comprised of a conductive metal or dielectric material impregnated with a conductive material, at the rear of the jack that at least partially encloses the wire management component while in the closed position. The jack door comprises a curved surface that partially surrounds the collar while in the closed position. A notch is formed in the curved surface of the rear door and is oriented to receive the collar’s bump while the door is in the closed position. When the jack door is in the closed position while the drain wire is routed over the notch on the collar, the drain wire is pinched between the bump of the collar and the notch of the door, establishing a robust ground connection of the category cable’s drain wire to the conductive metal rear door of the jack.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
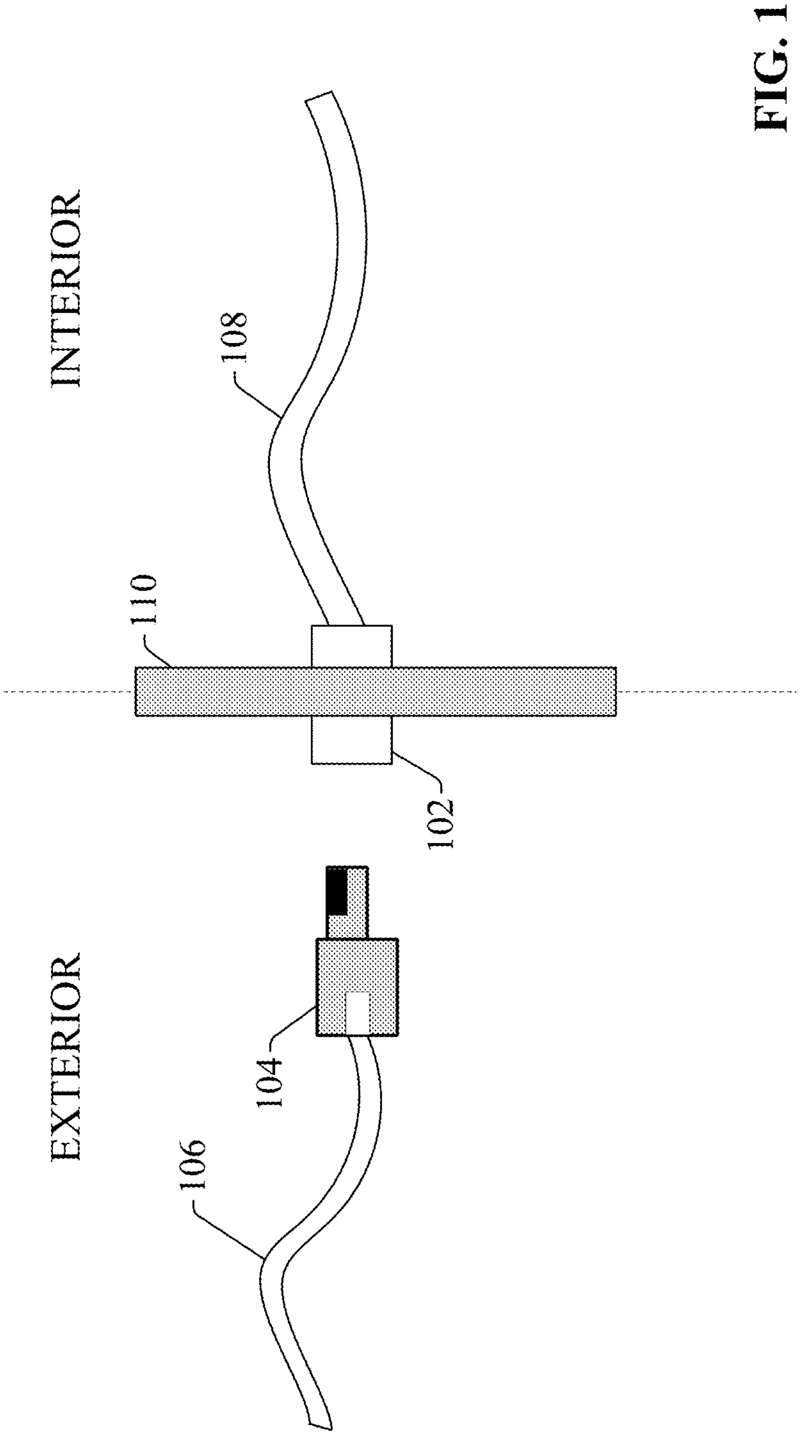
FIG. 1 is a side view of an example jack used to interface two category cables.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some reference numbers used herein to label illustrated components are suffixed with letters to delineate different instances of a same or similar component. In general, if a reference number without an appended letter is used within this disclosure, the descriptions ascribed to the reference number are to be understood to be applicable to all instances of that reference number with or without an appended letter unless described otherwise.

Category cable jacks are often used to terminate category cables, such as shielded twisted pair cables, and to interface those cables with other terminated cables that plug into the jacks. FIG. 1 is a side view of an example jack 102 used to interface two category cables 106 and 108. In an example application, a category cable jack 102 is mounted in a patch panel 110 or wall. A data cable 108, such as a shielded twisted pair cable, disposed on the "interior" side of the patch panel 110 is terminated on a rear (or "interior"-facing) side of the jack 102 such that the individual insulated conductors of the cable 108 are electrically connected to the conductive contacts or tines of the jack 102. A second category cable 106 disposed on the "exterior" side of the patch panel 110 is terminated with a data plug 104 of the same standard as the jack 102 (e.g., an RJ45 plug), and this plug 104 can be plugged into the "exterior"-facing aperture of the jack 102 to establish electrical coupling, and thus data transmission, between the conductors of cable 106 and the conductors of cable 108.

Figure 5:
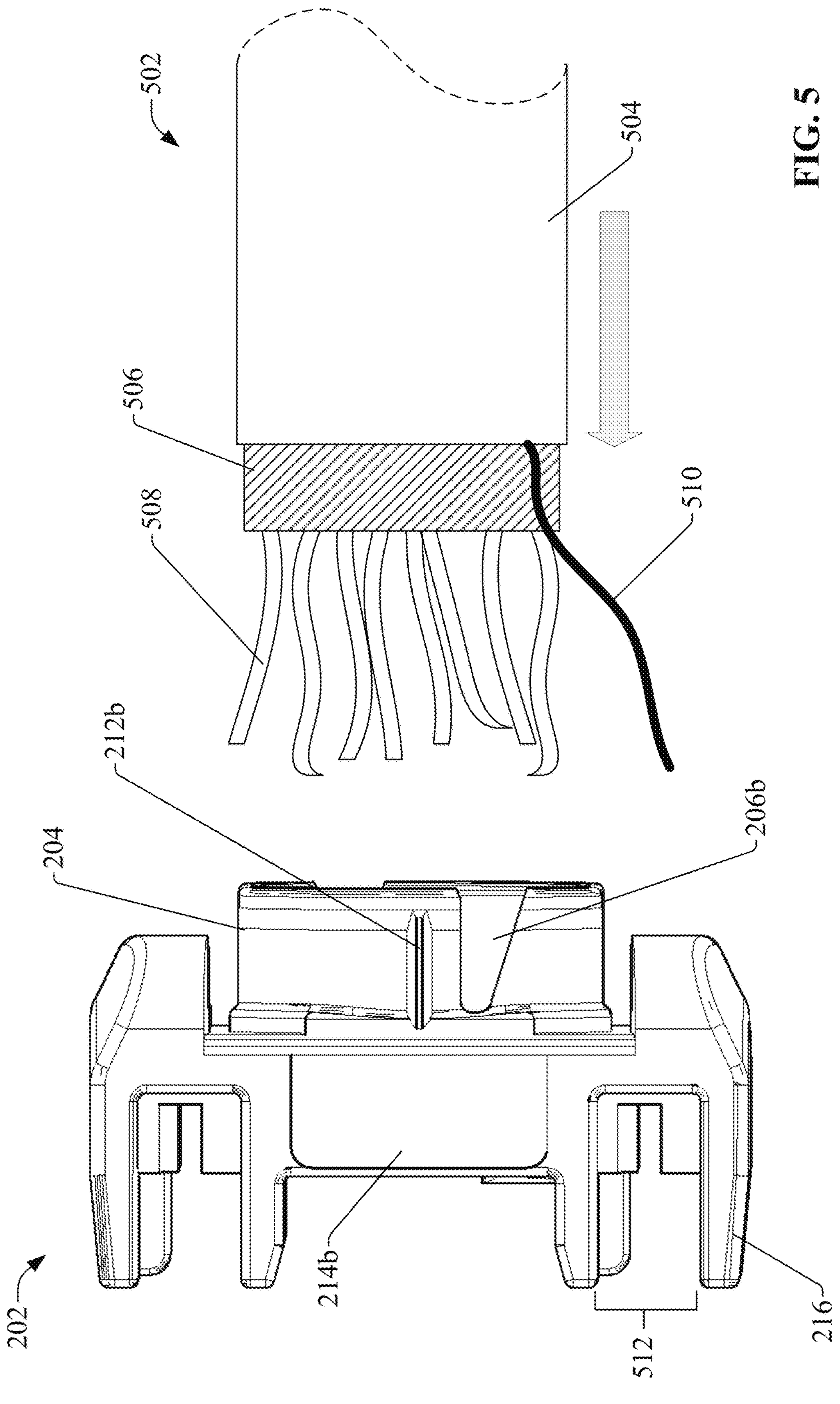
FIG. 5 is a side view of the wire management component with a category cable aligned for insertion into the wire management component.
Figure 15:
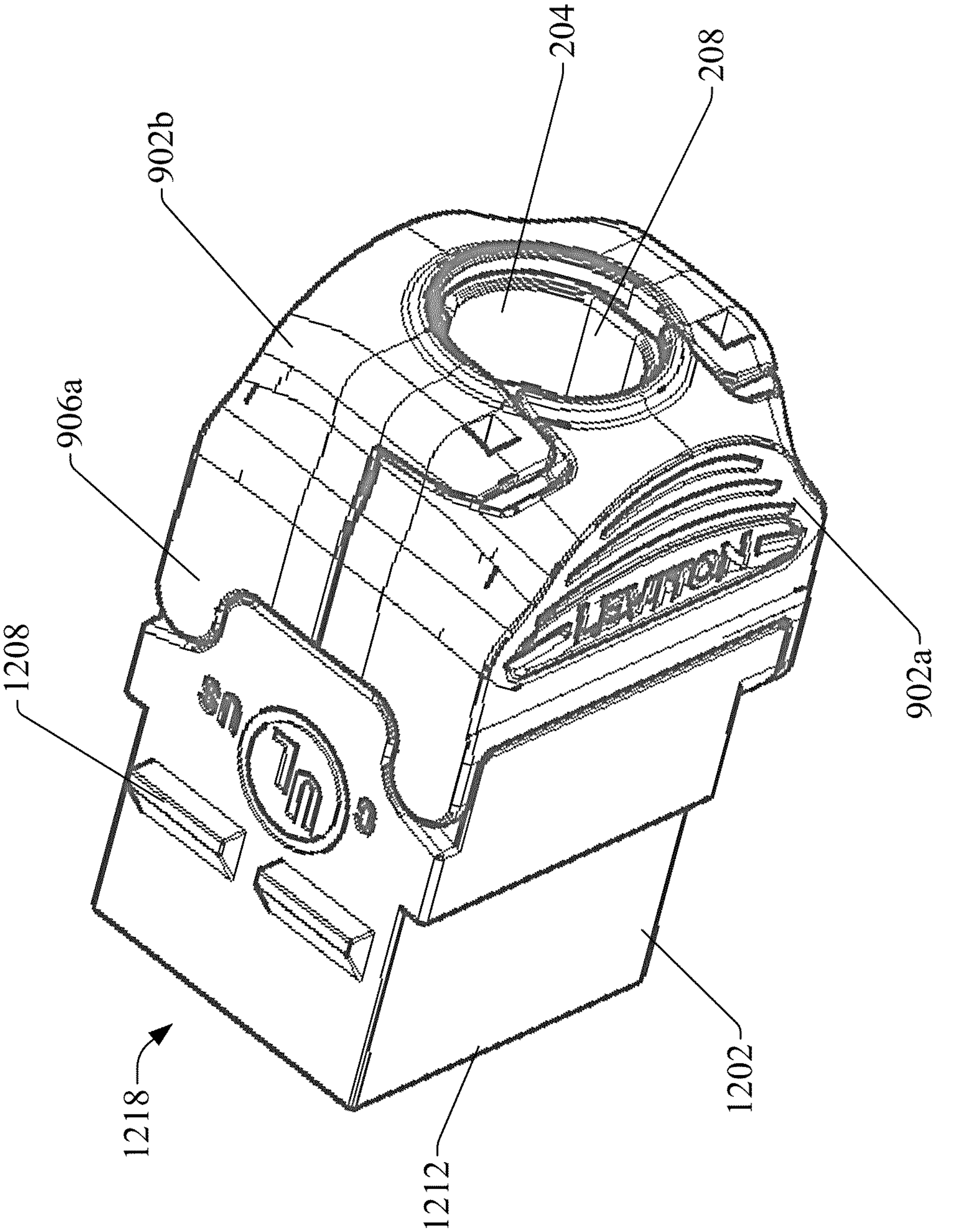
FIG. 15 is a perspective rear view of the assembled wire management component and jack body with two rear jack doors attached.
Figure 16:
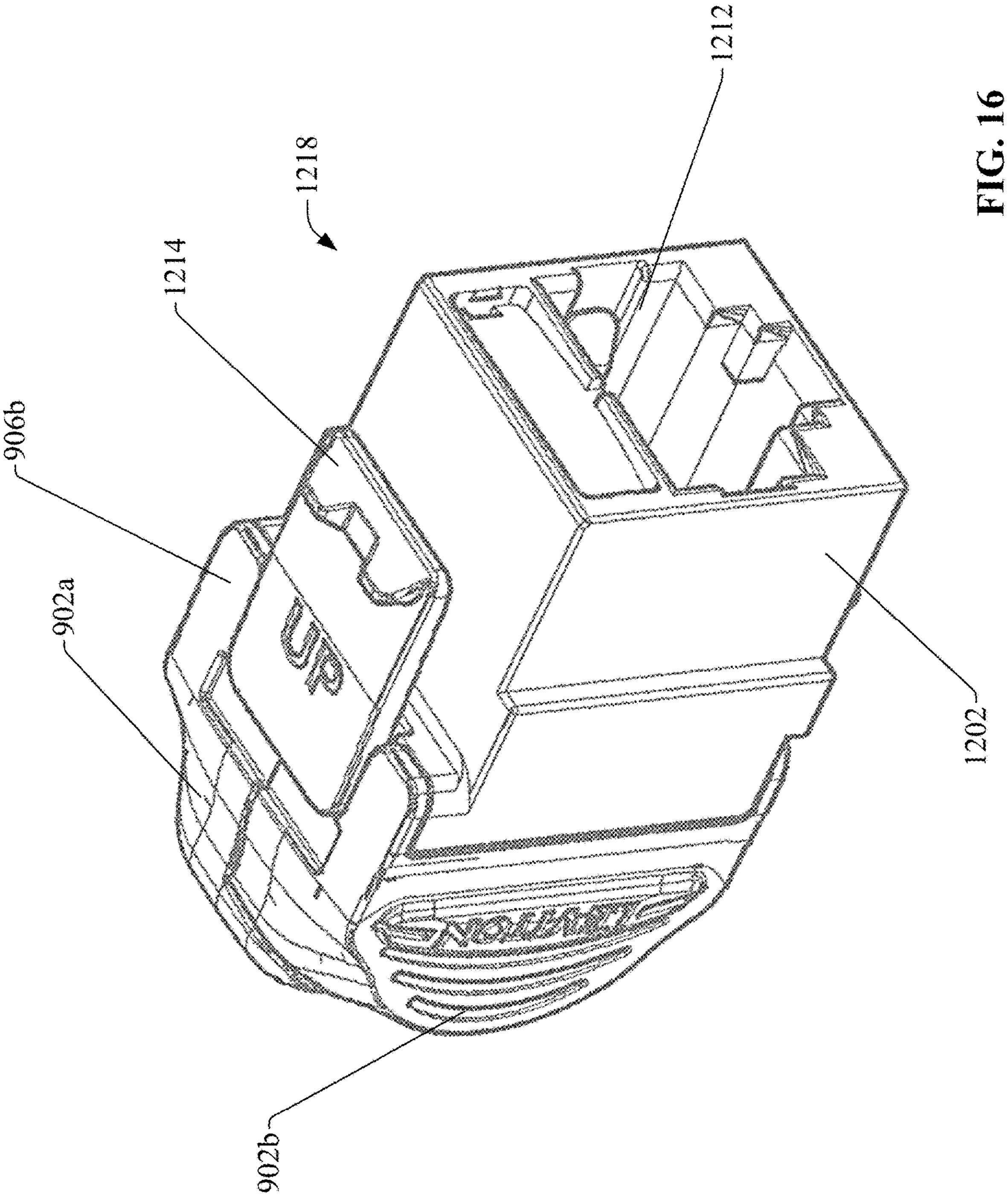
FIG. 16 is a perspective front view of the assembled wire management component and jack body with the two jack doors attached at the rear, cable-receiving end of the jack housing and the plug aperture at the opposing front end of the jack housing.

As depicted in FIG. 5, category cables 502 configured to be terminated to category connectors (e.g., RJ45 jacks (102) and plugs (104)) can include a layer of metallic or foil shielding 506 that surrounds the cable's insulated electrical conductors 508. When properly grounded via the cable's drain wire 510, this shielding 506 can mitigate the effects of electrical interference on the cable's data signals, which could otherwise introduce errors in data transmission. To ensure proper grounding, the cable's drain wire 510 should make secure and reliable contact with the metal casing or framework of the jack 102 (see also FIGS. 15 and 16 depicting category jack 1218 having jack body 1202 and rear doors 902*a*, 902*b*—all of which may be comprised of electrically conductive material, with cable reception hole 208 at the rear of jack 1218 and plug aperture 1212 disposed at the front of jack 1218, which itself can be grounded via the electrically conductive components of the framework of patch panel 110).

To address these and other issues, one or more embodiments described herein provide a category cable jack assembly having features that ensure secure and robust connectivity between the jack assembly's metal doors and the cable's drain wire and shielding, as well as features that promote consistent and organized termination of the cable's insulated conductors.

Figure 2:
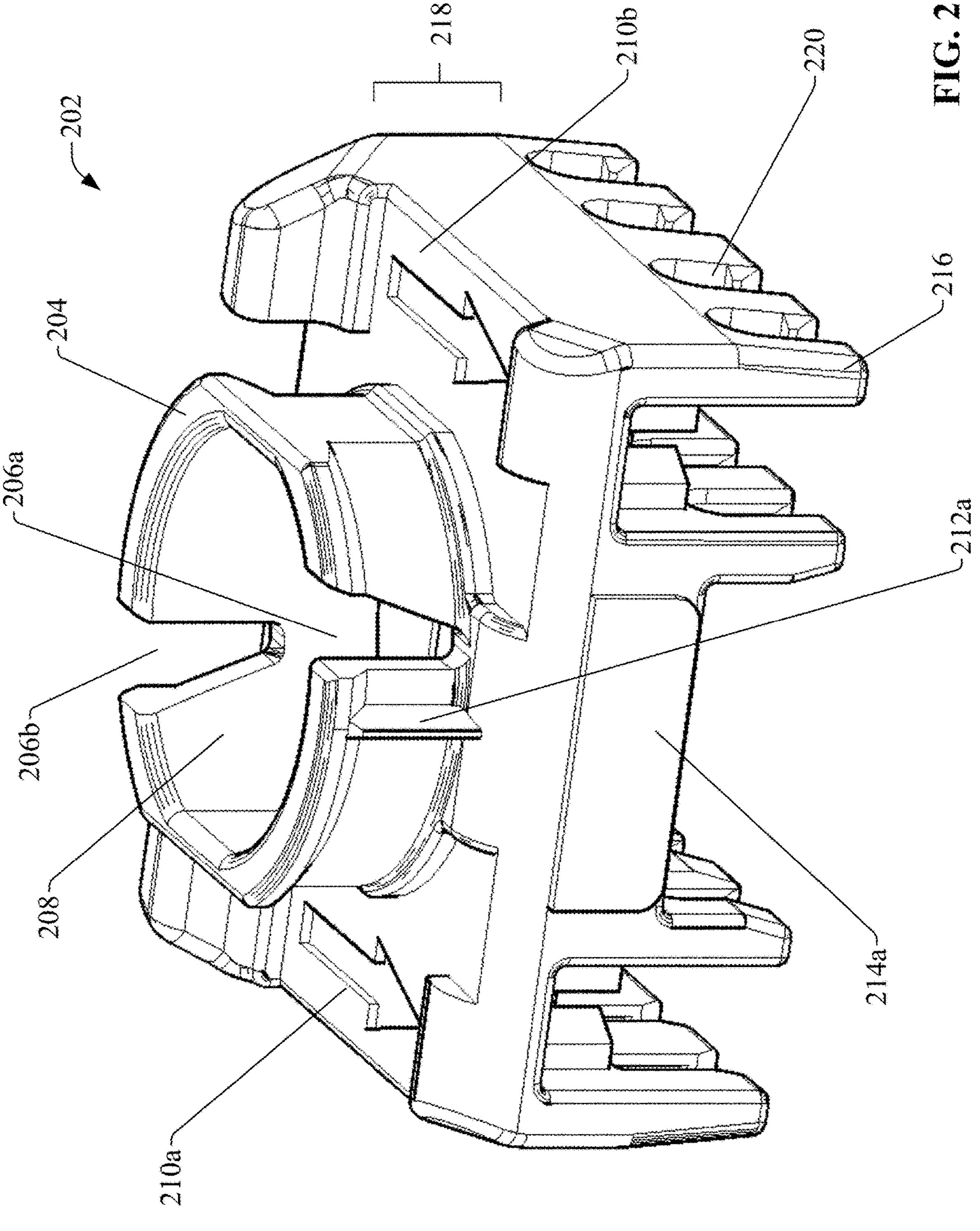
FIG. 2 is a perspective view of an example wire management component for use with a category cable jack.
Figure 3:
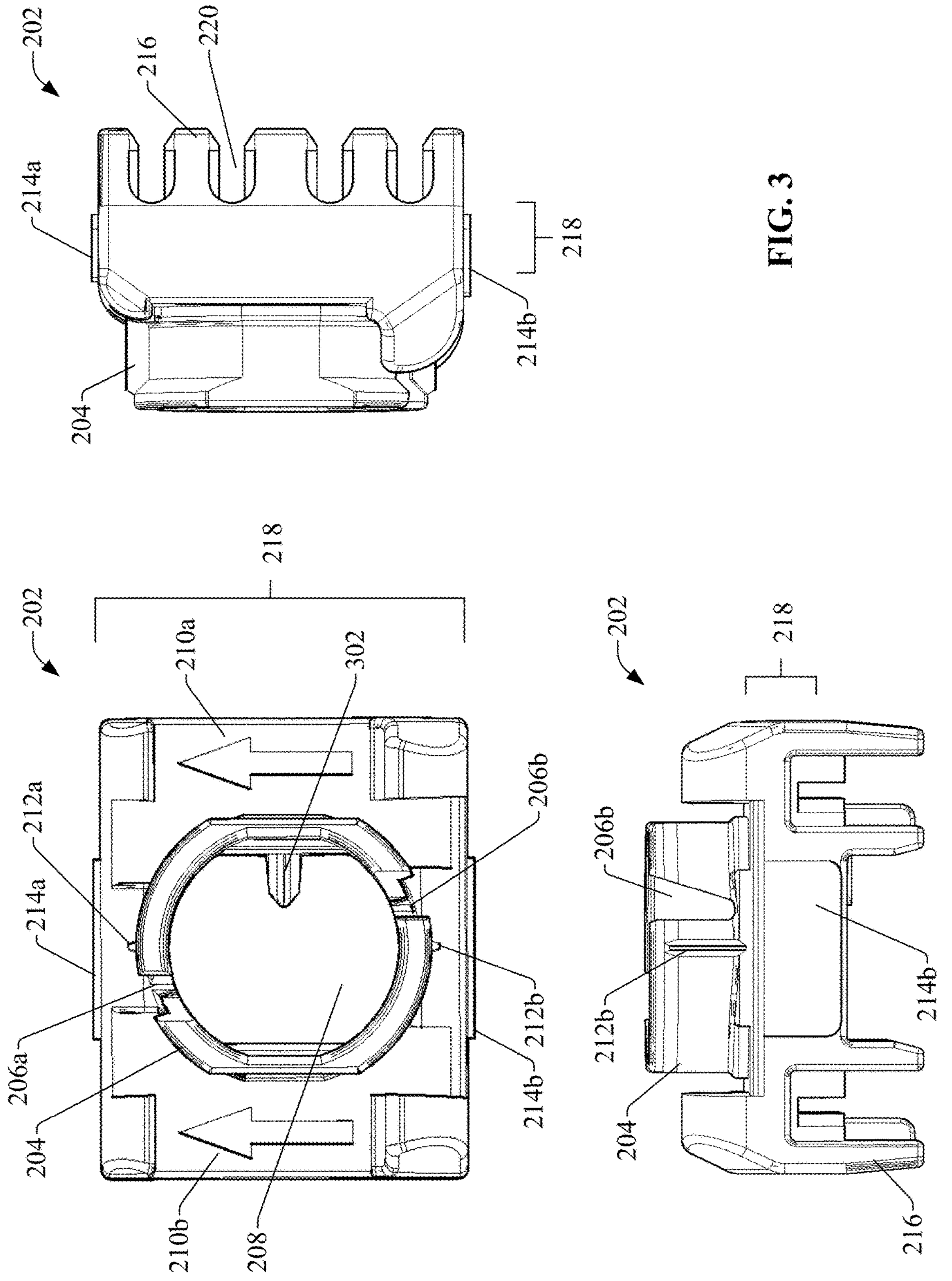
FIG. 3 is an orthographic projection view of the wire management component.
Figure 4:
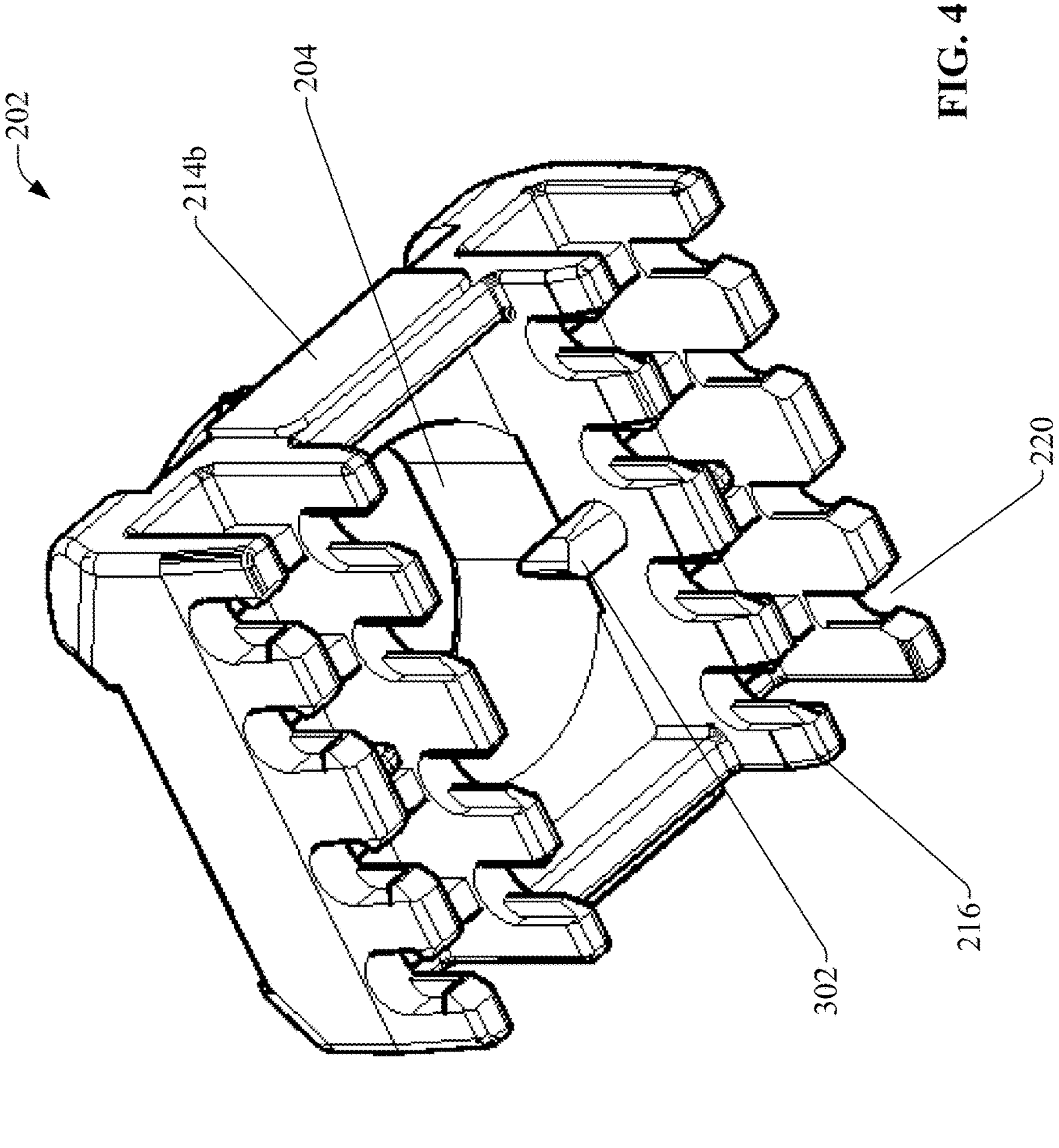
FIG. 4 is another perspective view of the wire management component depicting the bottom of the component.

FIG. 2 is a perspective view of an example wire management component 202 for use with a category cable jack (to be described in more detail herein). FIG. 3 is an orthographic projection view of the wire management component 202. FIG. 4 is another perspective view of the wire management component 202 displaying the bottom of the component 202. Wire management component 202 comprises a solid body having a base section 218 through which a cable reception hole 208 is formed. In the illustrated example, the base section 218 has a substantially rectangular shape.

However, base sections 218 of other shapes are also within the scope of one or more embodiments. Multiple conductor retaining towers 216 are formed on the bottom side of the base section 218. In the illustrated example, these conductor retaining towers 216 comprise four substantially parallel walls that project perpendicularly from the bottom of the base section 218, with a series of four retaining notches 220 formed along the bottom edge of each conductor retaining tower 216. Two conductor retaining towers 216 are formed on each of two opposite sides of the cable reception hole 208, with the retaining notches 220 of adjacent conductor retaining towers 216 substantially aligned with one another. Individual conductors of a category cable can be pressed into, and held by, these retaining notches 220. It is to be appreciated that embodiments of the wire management component 202 are not limited to the wire management structure illustrated in FIGS. 2-4, and that substantially any type or arrangement of conductor retaining mechanisms can be incorporated into the design of the wire management component 202 without departing from the scope of one or more embodiments.

On the top side of the base section 218 (that is, the side of the base section 218 that will receive the data cable), the cable reception hole 208 is surrounded by a collar 204 that projects from the base section 218 and traverses the perimeter of the cable reception hole 208. Two raised elongated bumps 212*a* and 212*b* are formed on the outer surface of the collar 204. The bumps 212*a* and 212*b* are located on opposite sides of the collar 204, each facing toward one of the two long edges of the rectangular base section 218. The bumps 212*a* and 212*b* extend substantially perpendicular to the surface of the base section 218 from the bottom edge of the collar 204 to the top edge of the collar 204 (or to a point near the top edge).

Figure 12:
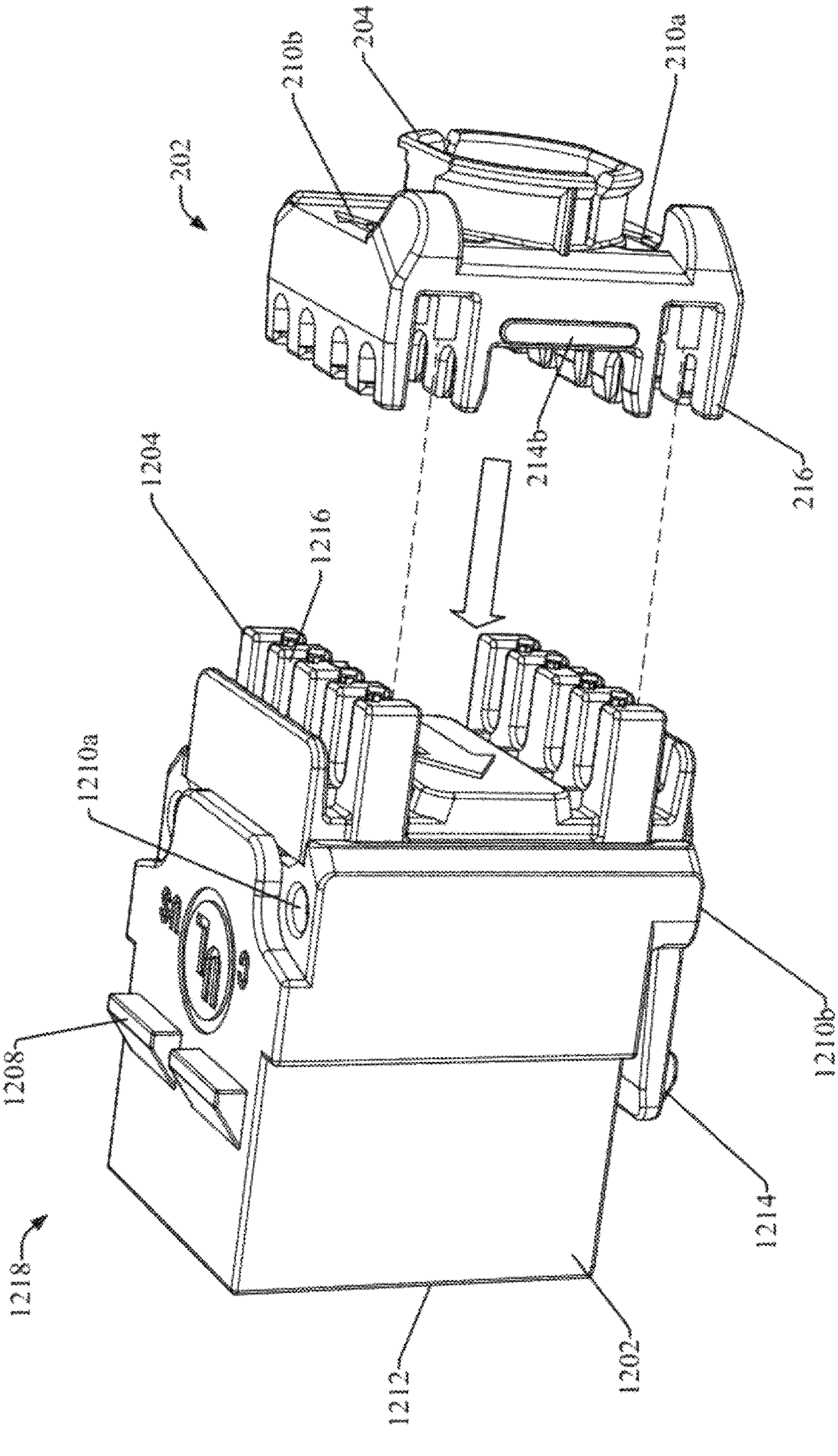
FIG. 12 is a perspective view of the wire management component aligned for coupling with the rear end of the jack.

Two slots 206*a* and 206*b* are also formed on the collar 204. Each slot 206*a*, 206*b* is formed near, or adjacent to, one of the raised elongated bumps 212*a*, 212*b* and opens at the top edge of the collar 204. Each slot 206*a*, 206*b* extends from the bottom edge of the collar 204 (or from a point near the bottom edge of the collar 204) to the top edge of the collar 204, creating corresponding gaps along the top edge of the collar 204 where the slots 206*a*, 206*b* meet the top edge. These gaps serve as entrances into the slots 206*a*, 206*b* through which the cable's drain wire 510 (see, e.g., FIG. 5) is received, as will be described in more detail herein. At least one edge of each slot 206*a*, 206*b* is angled relative to its opposing edge, causing the tops of the slots 206*a*, 206*b* (and their corresponding gaps along the top edge of the collar 204) to be wider than the bottoms of the slots 206*a*, 206*b*. That is, the slots 206*a*, 206*b* are tapered from the top edge of the collar 204 to the bottom edge of the collar 204. The relatively wide slot entrances can assist in guiding the cable's drain wire 510 into the slots 206*a*, 206*b* as the conductors 508 of the cable are being arranged and secured on the wire management component 202 in preparation for termination to contacts 1216 (e.g., insulation displacement contacts ("IDC") as shown in FIG. 12) positioned within the jack housing.

The wire management component 202 also comprises two drain wire recesses 210*a* and 210*b*, which are adjacent to the collar 204 on the top surface of the base section 218. The drain wire recesses 210*a* and 210*b* comprise the areas of the top surface of the base section 218 between the collar 204 and each of the two short edges of the rectangular base section 218 (that is, the two edges that are adjacent to the long edges toward which the bumps 212*a* and 212*b* face). These drain wire recesses 210*a*, 210*b* serve to hold the cable's excess drain wire, as will be described in more detail herein.

As can be seen in the bottom view of the wire management component 202 of FIG. 4, a single cable stop post 302 is formed on the base section 218, adjacent to one of the two conductor retaining towers 216 which, in turn, is adjacent to the cable reception hole 208. The single cable stop post 302 is formed on the inward-facing surface of the base section 218 and is located a small distance below the hole 208 such that the single cable stop post 302 protrudes into the path of a cable that would be inserted through hole 208 from the top of the wire management component 202. When a cable is inserted through the hole 208 from the top of the wire management component 202, the single cable stop post 302 acts as a hard stop that impedes the leading edge of the cable's jacket, preventing the leading edge of the cable's jacket from being inserted beyond a fixed distance from the bottom of the hole 208 (a distance corresponding to the distance between the exit of the hole 208 and the cable stop post 302).

Two raised removal ridges 214*a* and 214*b* are also formed on two opposite sides, respectively, of the wire management component 202. In the illustrated example, the removal ridges 214*a* and 214*b* are formed on the outward-facing surfaces of the two long sides of the base section 218 (that is, the same sides of the base section 218 toward which the bumps 212*a* and 212*b* face). These removal ridges 214*a* and 214*b* serve as grip points for a user's fingers when disconnecting the wire management component 202 from its associated jack assembly, as will be described in more detail herein.

FIG. 5 is a side view of the wire management component 202 with a category cable 502 (e.g., a shielded twisted pair cable) aligned for insertion through the cable reception hole 208 of wire management component 202. The category cable 502 comprises multiple twisted pairs of insulated conductors 508 housed within a cable jacket 504. The insulated conductors 508 as a group are wrapped with metallic or foil shielding 506, which is layered between the group of insulated conductors 508 and the cable jacket 504. The cable 502 also houses a conductive drain wire 510 that traverses the length of the cable 502 between the shielding 506 and the cable jacket 504, making electrical contact with the shielding 506. When properly grounded this drain wire 510 serves as a path to ground for the shielding 506, and the grounded shielding 506 mitigates the adverse effects of electrical interference (such as alien crosstalk) on the data signals passing through the conductors 508.

Figure 6:
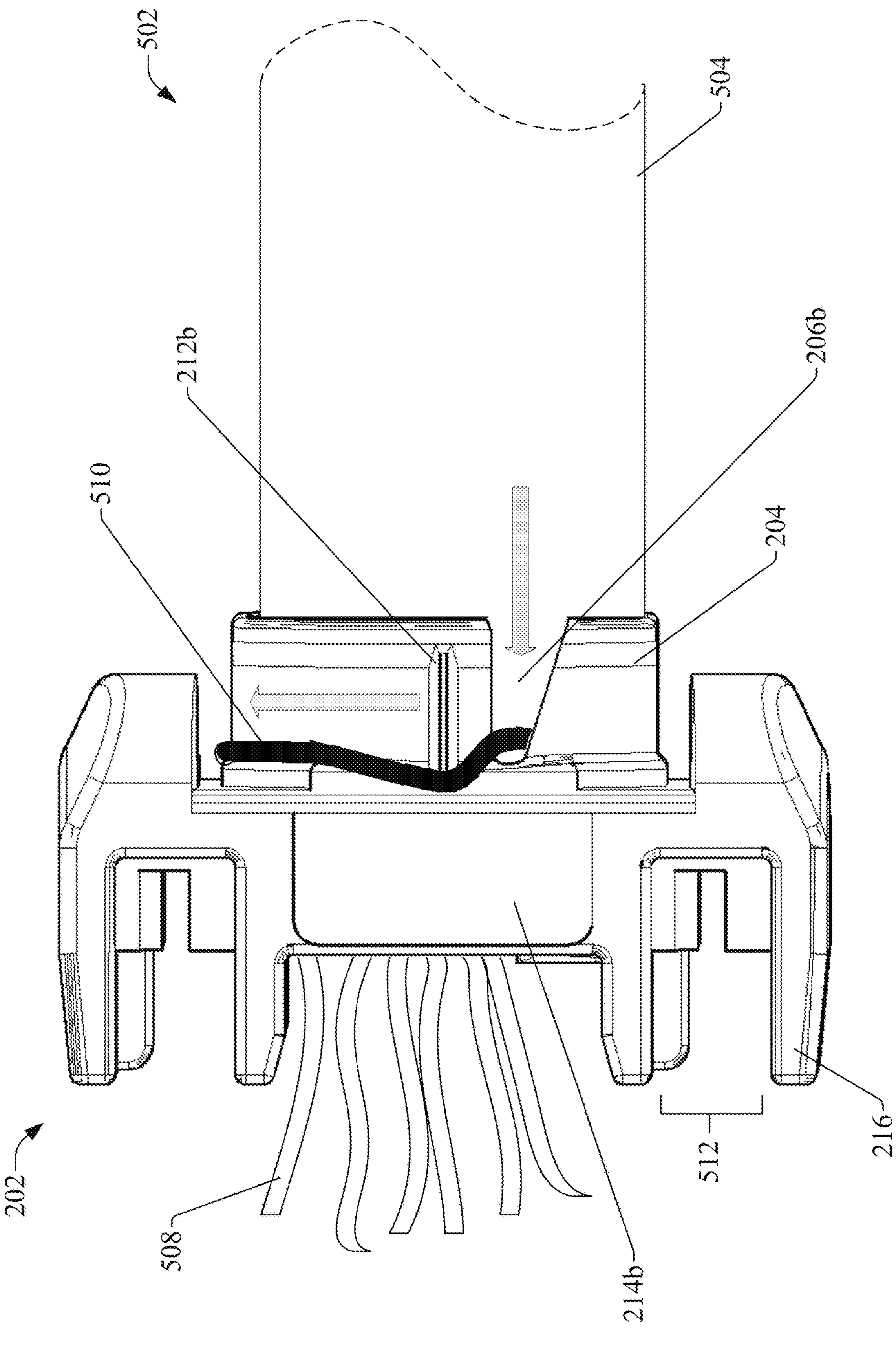
FIG. 6 is a side view of the wire management component and cable after the cable has been inserted through the wire management component’s cable reception hole.

Prior to installation, a portion of the cable jacket 504 is stripped to expose lengths of insulated conductors 508 and a segment of the drain wire 510. To install the cable 502 on the wire management component 202, the stripped end of the cable 502, including the exposed insulated conductors 508, is inserted through the cable reception hole 208 via the top side of the wire management component 202 (that is, via the side of the cable reception hole 208 surrounded by collar 204). Rather than being pulled through the cable reception hole 208 along with the insulated conductors 508, the drain wire 510 is pulled aside (or can be folded back against the cable's jacket 504) so that the drain wire 510 can be routed through one of the slots 206. FIG. 6 is a side view of the wire management component 202 and cable 502 after the cable 502 has been inserted through the cable reception hole 208. The wire management component 202 permits the cable 502 to be inserted through the cable reception hole 208 until the leading edge of the cable jacket 504 abuts against the cable stop post 302 (see FIGS. 3 and 4), which limits the length of the cable jacket 504 that is permitted to pass beyond the exit of the cable reception hole 208 to a length corresponding to the distance between the exit of the cable reception hole and the cable stop post 302. The use of cable stop post 302 to limit the insertion depth of the jacketed portion of the cable 502 can ensure general consistency in the length of exposed conductors 508 that are held by the conductor retaining towers 216, which can result in a neater organization of conductors 508 and reduced susceptibility to coupling between adjacent conductor pairs. In the illustrated example, the wire management component 202 includes only a single cable stop post 302. The use of a single cable stop post 302 to limit insertion of the jacket 504 can afford the user a greater degree of freedom in manipulating the conductors 508 relative to a more intrusive stopping mechanism.

Figure 7:
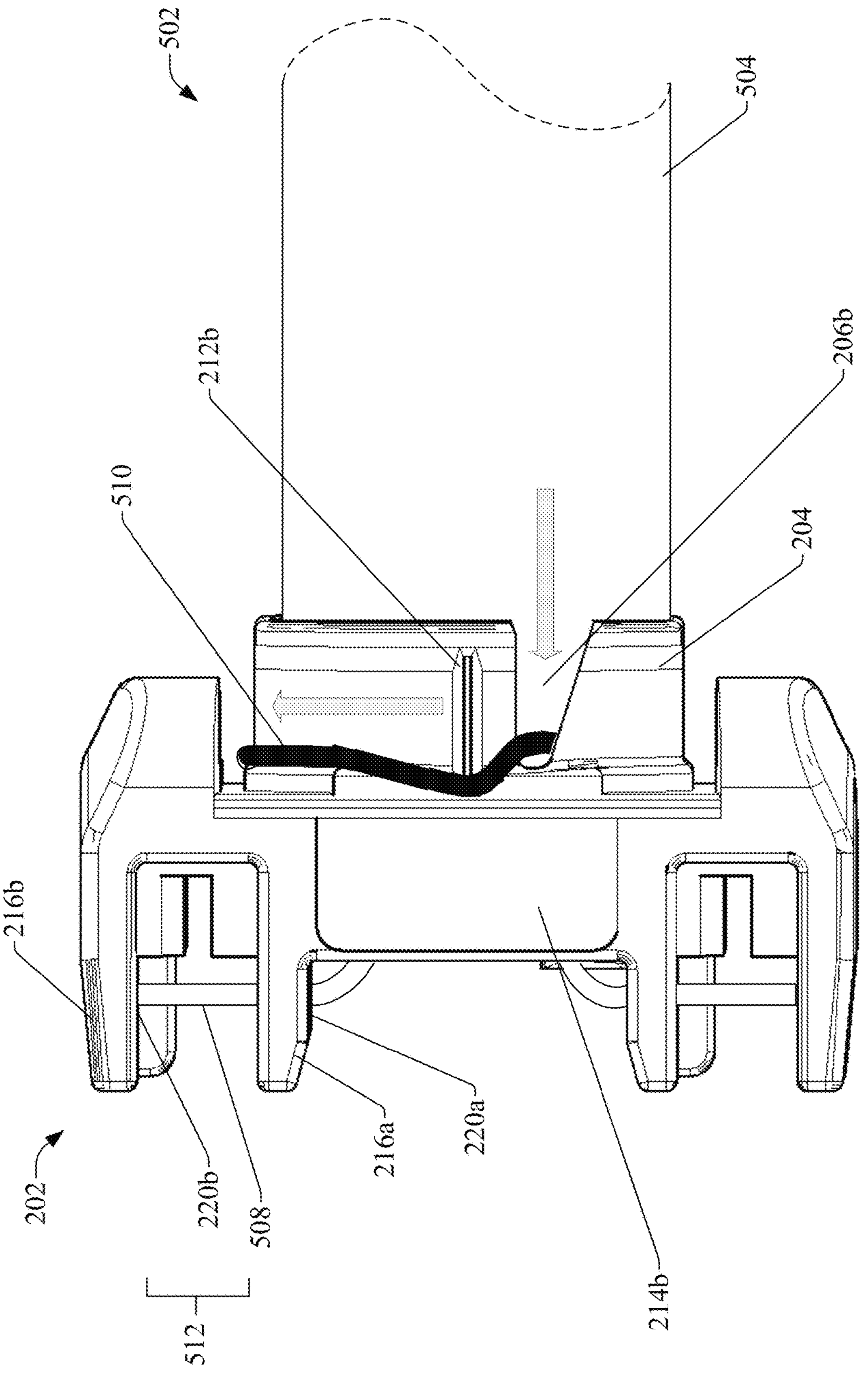
FIG. 7 is a side view of the wire management component and cable with the insulated conductors of the cable inserted into retaining notches of the wire management component’s retaining towers.

While the cable 502 is inserted through the cable reception hole 208, the exposed insulated conductors 508, which are now located on the side of the wire management component 202 containing the conductor retaining towers 216, can be installed on the retaining notches 220. FIG. 7 is a side view of the wire management component 202 and cable 502 with the insulated conductors 508 inserted into, and retained by, the retaining notches 220 of the conductor retaining towers 216. The conductor retaining towers 216 are comprised of a non-conductive, dielectric material with individual conductors 508 inserted into, and retained by, the retaining notches 220. In the illustrated example, each conductor 508 of the cable 502 is terminated across two adjacent conductor retaining towers 216 (e.g., conductor retaining towers 216*a* and 216*b*). Specifically, the conductor 508 is inserted into a retaining notch 220*a* of a first conductor retaining tower 216*a* adjacent to the cable reception hole 208, and is also inserted into a conductor retaining notch 220*b* of a second conductor retaining tower 216*b* adjacent to the first conductor retaining tower 216*a*, where the two retaining notches 220*a* and 220*b* are an aligned pair. When the conductor 508 is held by the notches 220*a* and 220*b* in this manner, a segment of the conductor 508 traverses the gap 512 between the two conductor retaining towers 216*a* and 216*b*. This conductor segment will interface with the cutting edge of an insulation displacement contact ("IDC") configured to pierce the outer insulating layer of each insulated conductor 508 to electrically couple the inner conductive core of each insulated conductor 508 with the IDC, when the wire management component 202 is connected to the jack body. It is to be appreciated that the conductor arrangement and retention method illustrated herein is only intended to be exemplary, and that any suitable conductor retention and organizing mechanism can be implemented in the design of the wire management component 202 without departing from the scope of one or more embodiments.

Figure 8:
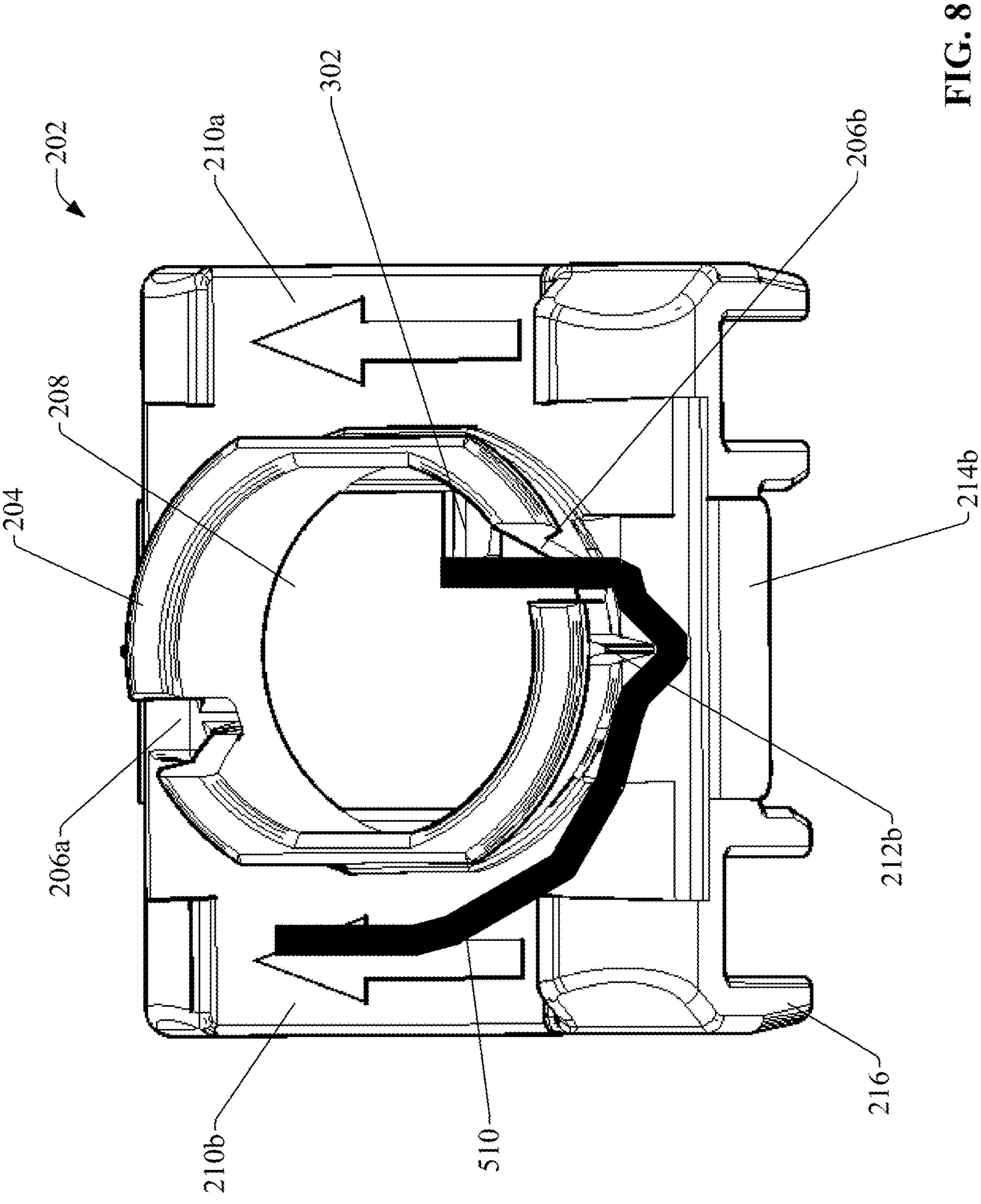
FIG. 8 is a perspective view of the wire management component illustrating the routing of the drain wire.

Rather than being pulled through cable reception hole 208 along with the cable's conductors 508, the cable's drain wire 510 is instead seated in one of the two slots 206*a* or 206*b* of the collar 204 of the wire management component 202. FIG. 8 is a perspective view of the wire management component 202 illustrating the routing of the drain wire 510 (the cable 502 is omitted from FIG. 8 for clarity). As can be seen in this figure, as well as in FIGS. 6 and 7, the drain wire 510 is inserted into the slot 206 such that the drain wire 510 exits the collar 204 through the bottom of the slot 206, and is then routed around the collar 204 to one of the two drain wire recesses 210*a* and 210*b*. The tapered shape of the slot 206, which yields a relatively wide slot entrance on the edge of the collar 204, assists the user in guiding the drain wire 510 into the slot 206. The drain wire 510 is routed to the drain wire recess 210*a* or 210*b* that is farthest from the slot 206 through which the drain wire 510 exits, which causes the drain wire 510 to pass over the elongated bump 212 that is adjacent to the slot 206. Any excess length of the drain wire 510 resides on the drain wire recess 210.

Figure 9:
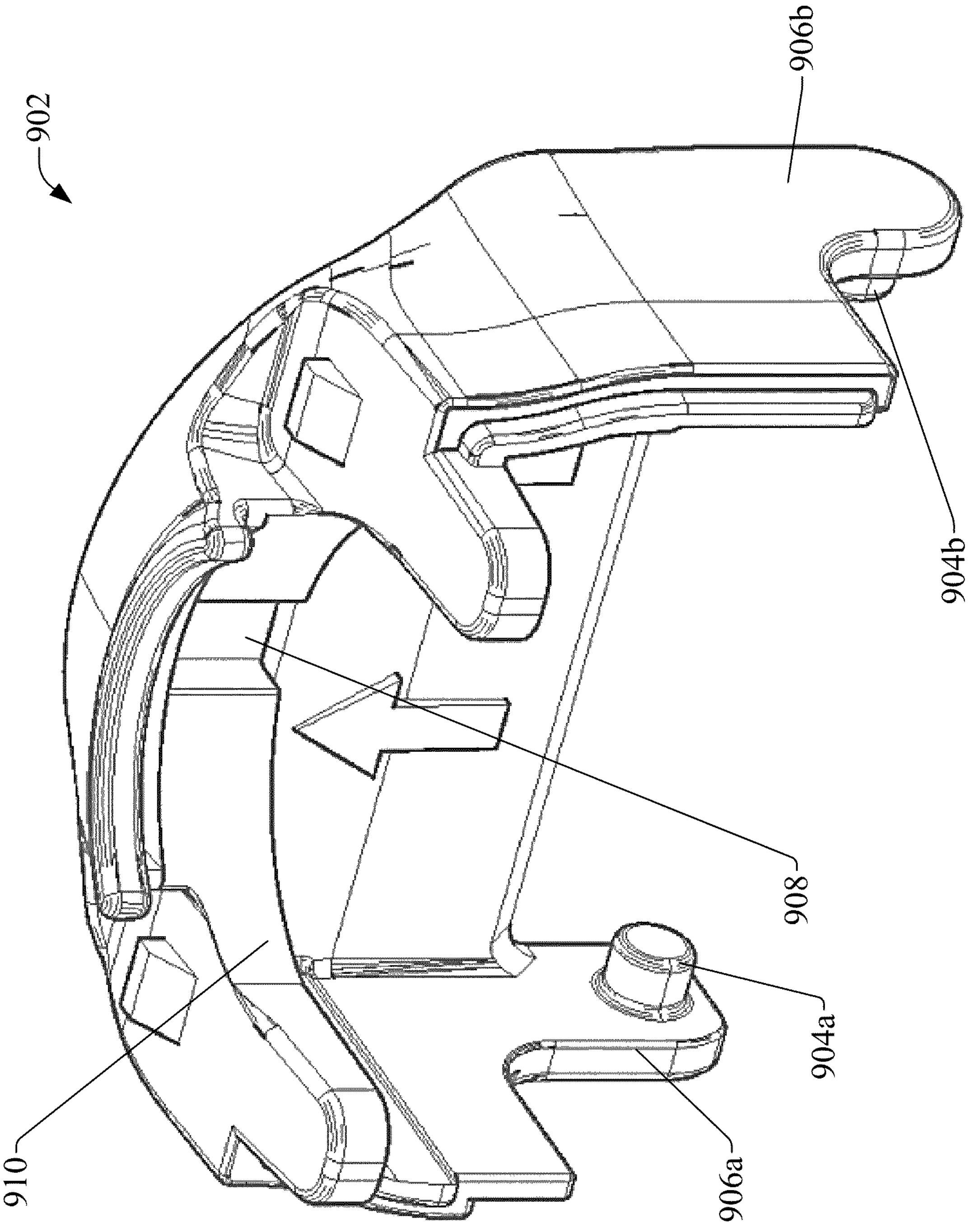
FIG. 9 is a perspective view of an example jack rear door that interfaces with the wire management component as part of a jack assembly.

The bump 212, together with a corresponding notch (e.g., notch 908) on a rear conductive jack door (e.g., rear door 902) (see, e.g., FIG. 9) that closes over the wire management component 202, leverage the mechanical properties of the drain wire 510 to establish secure electrical contact between the drain wire 510 and the jack door 902. FIG. 9 is a perspective view of an example jack door 902 that interfaces with the wire management component 202 as part of a jack assembly. Jack door 902 comprises two hinge arms 906*a* and 906*b* on which are formed respective two inward-facing dowels 904*a* and 904*b*. Dowels 904*a* and 904*b* are configured to engage with corresponding holes (not shown in FIG. 9) that are part of the jack assembly to form a hinge. The resulting hinge is located below the wire management component 202 when the jack components are assembled, such that the door 902 pivots about the dowels 904*a*, 904*b* between an open position that exposes wire management component 202 and a closed position that partially encloses the wire management component 202.

Figure 10:
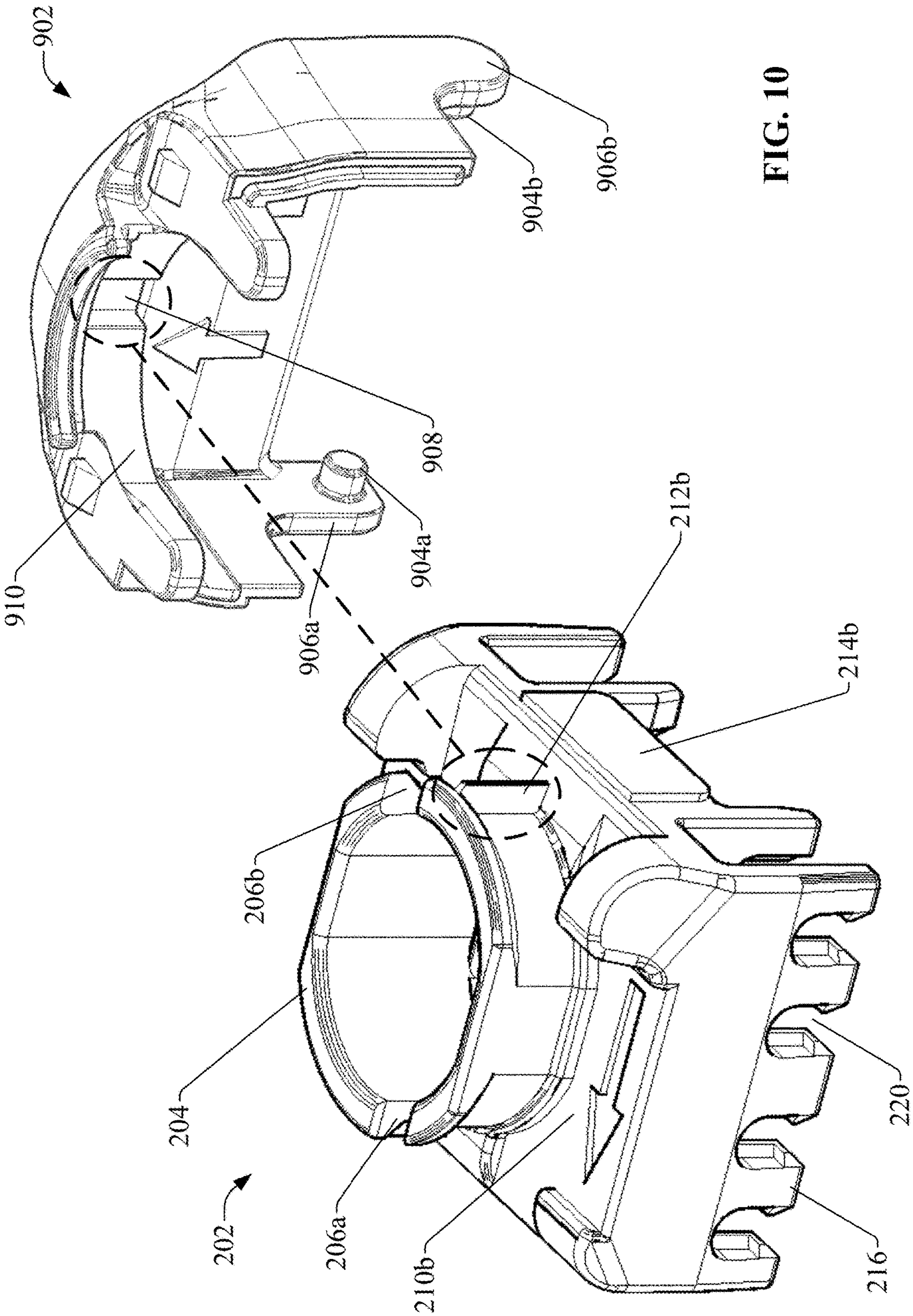
FIG. 10 is a perspective view of the jack rear door and the wire management component illustrating the correspondence between the notch on the jack rear door and the bump on the wire management component.

Jack door 902 also comprises a curved surface 910 that partially surrounds the collar 204 of the wire management component 202 while the jack door 902 is in the closed position. A notch 908 is formed on this curved surface 910 of jack door 902 at a location that corresponds to the location of the elongated bump 212 on the collar 204. FIG. 10 is a perspective view of the jack door 902 and the wire management component 202 illustrating the correspondence between the notch 908 and the bump 212. When the rear jack door 902 is in the closed position, the bump 212 on the collar 204 resides within the notch 908 formed on the curved surface 910 of the rear jack door 902. If the drain wire 510 is routed over the bump 212 while the rear jack door 902 is closed (as shown in FIGS. 6-8), the portion of the drain wire 510 that traverses over the bump 212 is pinched between the bump 212 and the notch 908.

Figure 11:
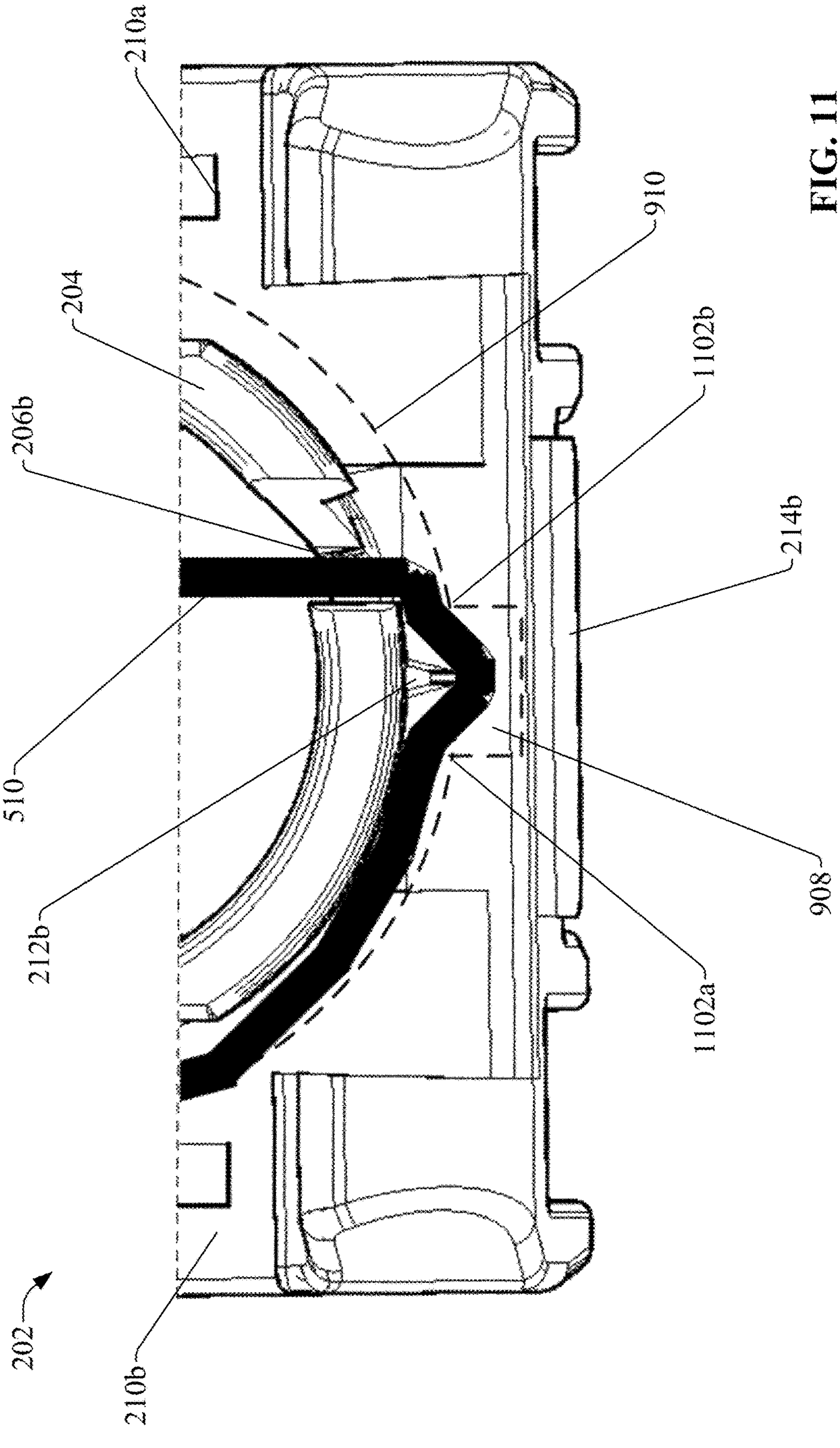
FIG. 11 is a close-up view of the wire management component illustrating the pinching of the drain wire between the bump of the wire management component and the notch in the rear door of the jack while the jack door is in the closed position.

FIG. 11 is a close-up view of the wire management component 202 illustrating the pinching of the drain wire 510 between the bump 212 and the notch 908 while the rear jack door 902 is in the closed position. In this figure, the curved surface 910 of the rear jack door 902 and the notch 908 formed in the curved surface 910 are represented as dashed lines for clarity. As can be seen in this figure, while the rear jack door 902 is in the closed position, the convex corners 1102*a* and 1102*b* of the notch 908—that is, the convex corners 1102*a*, 1102*b* formed between the curved surface 910 and the notch 908—press against respective two points on the drain wire 510 on either side of the elongated bump 212. In addition to establishing electrical contact between the contact points of the drain wire 510 and the two corners 1102*a* and 1102*b*, the compression force applied to these points of the drain wire 510 by the two convex corners 1102*a* and 1102*b* causes portions of the drain wire 510 near the corners 1102*a*, 1102*b* to deflect toward the curved surface 910 of the rear jack door 902 due to the spring properties of the drain wire 510. Thus, the bump 212 and the notch 908 act together to securely retain the position of the drain wire 510 and to establish a robust electrical connection between the drain wire 510 and the metal rear jack door 902, ensuring that the cable's shielding has a secure path to ground via the metallic surface of the rear jack door 902.

While the rear jack door 902 is in the closed position, the excess length of drain wire 510 resides in one of the two drain wire recesses 210*a* and 210*b* (see, e.g., FIG. 8, which depicts the excess drain wire 510 residing in recess 210*b*). The rear jack door 902 and the drain wire recesses 210*a* and 210*b* are designed such that, while the rear jack door 902 is in the closed position, there is a space between the surfaces of the drain wire recesses 210*a*, 210*b* and the section of the rear jack door 902 above the recesses 210*a*, 210*b*. This space provides clearance within which the excess portion of the drain wire 510 resides without being pinched between the recesses 210*a*, 210*b* and the rear jack door 902, and without increasing termination force.

FIG. 12 is a perspective view of the wire management component 202 aligned for mating with a jack body 1202 of a jack 1218. In this example design, jack 1218 comprises a jack body 1202 having an aperture 1212 (not visible in FIG. 12, but visible in FIG. 16) configured to receive a category cable plug (e.g., an RJ45 plug). The aperture 1212 faces through the front side of the jack body 1202. One or more IDC towers 1204 are formed on the opposing rear side of the jack body 1202. Similar to conductor retaining towers 216, these IDC towers 1204 are substantially parallel non-conductive walls that project perpendicularly from the rear of the jack body 1202. A series of conductive IDCs 1216, that are disposed in, and electrically coupled to, a printed circuit board (PCB) within the jack body 1202 (not shown), reside within, and are electrically isolated by, each IDC tower 1204. It is these IDC 1216 upon which cable conductors 508 are electrically terminated when the wire management component 202 is coupled to the rear end of jack body 1202.

Figure 13:
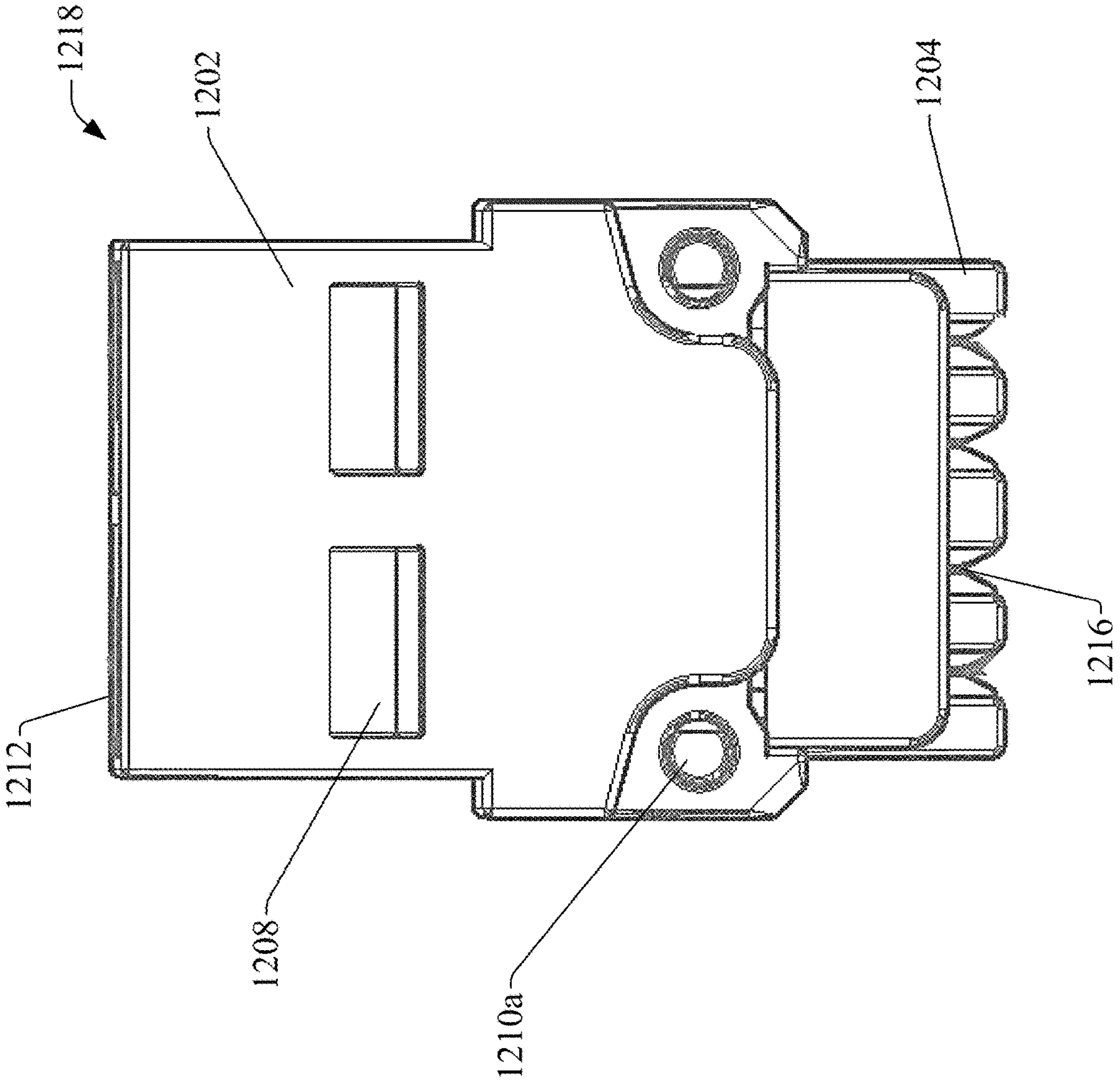
FIG. 13 is a view of one of the four outer surfaces of the jack housing.

FIG. 13 is a view of one of the sides of the jack 1218 in which the IDCs 1216, residing within IDC towers 1204, can be seen. The IDCs 1216 are electrically connected, via conductive traces of the PCB (not shown) in which the IDCs 1216 are disposed, to respective conductive tines that extend from the opposing side of the PCB (not shown) outward and into the aperture 1212 of the jack 1218 and so positioned to electrically couple the conductive blades of a category plug (not shown) inserted into the aperture 1212. Two hinge holes 1210*a*, 1210*b* are formed on two opposite rear corners of the jack body 1202, and are configured to receive the dowels 904*a* and 904*b* of the jack door 902. A cantilevered latch 1214 (see, e.g., FIG. 14) is formed on one side of the jack body 1202, and two raised wall stops 1208 (see, e.g., FIGS. 13, 14) are formed on the side of the jack body 1202 opposite the side on which the latch 1214 is formed. The latch 1214 and wall stops 1208 serve to retain the jack body 1202 in an opening of a patch panel, wall outlet, or other such supporting structure.

Figure 14:
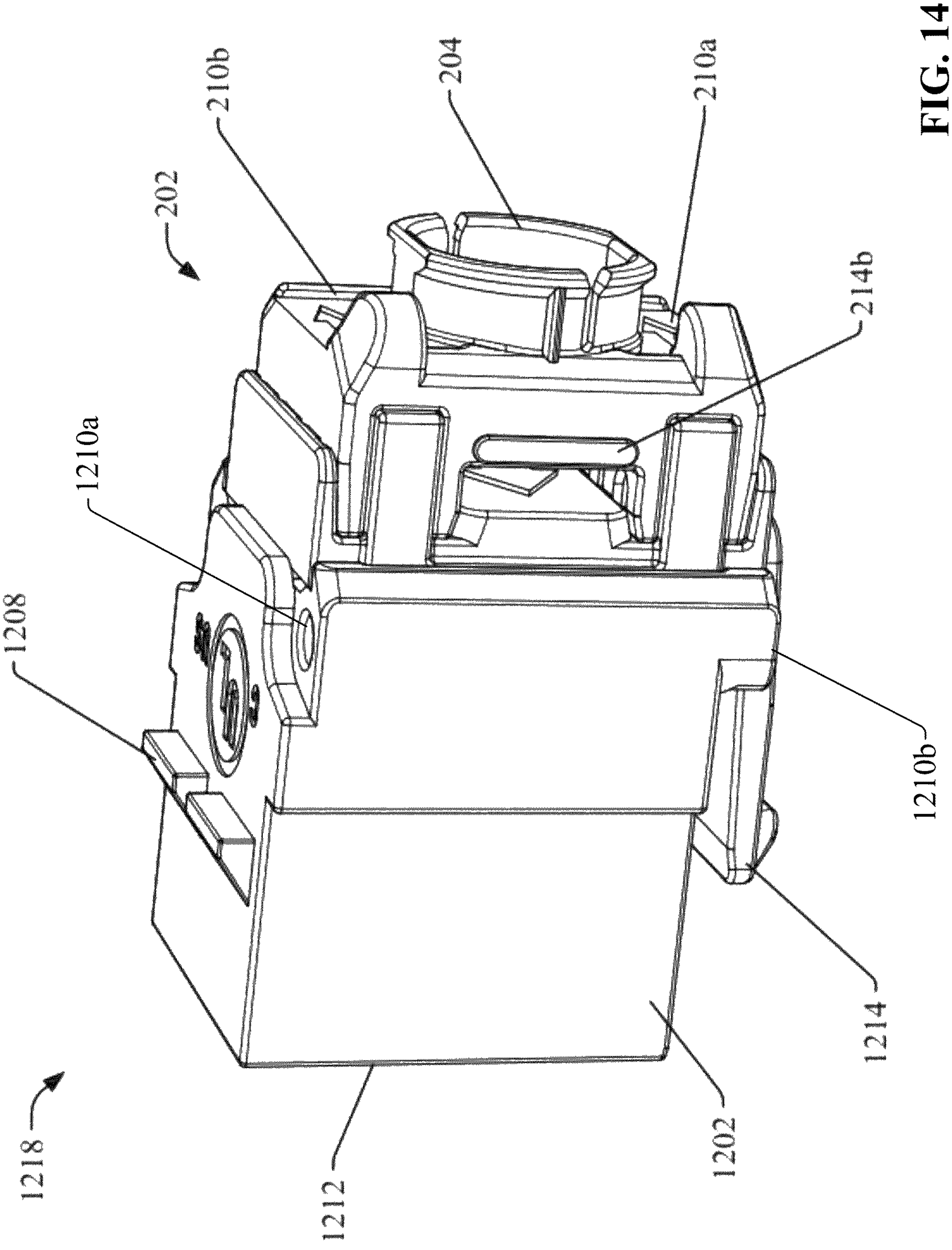
FIG. 14 is a perspective view of the wire management component installed on the rear side of the jack body.

With the conductors 508 of the cable 502 held by the conductor retaining towers 216 of the wire management component 202 as described above (the cable 502 and its conductors are omitted from FIG. 12 for clarity), the wire management component 202 can be aligned with, and installed on, the rear side of the jack body 1202 as shown in FIG. 12. FIG. 14 is a perspective view of the wire management component 202 installed on the rear side of the jack body 1202. When the wire management component 202 and the jack body 1202 are brought together, each IDC tower 1204 of the jack body 1202 is received between a pair of adjacent conductor retaining towers 216 of the wire management component 202 (as illustrated by the dashed lines in FIG. 12). The IDCs 1216 positioned within the jack 1218 are oriented such that, when the IDC towers 1204 of the jack body 1202 are received between the pairs of adjacent conductor retaining towers 216 of the wire management component 202, each IDC 1216 electrically engages with the segment of a conductor 508 that bridges the gap 512 between the two adjacent conductor retaining towers 216 of the wire management component 202 (see gap 512 in FIG. 7) by slicing through (e.g., "piercing") the insulation of the conductor 508 and making contact with the underlying wire. This establishes electrical continuity between each conductor 508 of the cable 502 and the conductive tines within the jack's aperture 1212, thus electrically interfacing the cable 502 with the jack 1218 and, thereby, with a category plug (not shown) inserted into the aperture 1212 of jack 1218 (see, e.g., FIG. 12). If the user wishes to disconnect the wire management component 202 from the jack body 1202, the two raised removal ridges 214*a* and 214*b* serve as grip points for a user's fingers to assist in pulling the wire management component 202 from the jack body 1202 when rear jack doors 902*a*, 902*b* are in the open position.

FIG. 15 is a perspective rear view of the assembled wire management component 202 and jack body 1202 with two rear jack doors 902*a* and 902*b* attached, yielding a jack assembly. Rear jack door 902*a* has a design corresponding to that illustrated in FIG. 9. As noted above, the dowels 904*a*, 904*b* formed on the hinge arms 906*a*, 906*b* of jack door 902*a* engage with corresponding hinge holes 1210*a*, 1210*b* formed on two rear corners of the jack body 1202 (dowels 904*a*, 904*b* and hinge holes 1210*a*, 1210*b* are not visible in FIG. 15). When attached to the jack body 1202 in this manner, the rear jack door 902*a* can pivot about the hinge holes 1210*a*, 1210*b* between an open position that exposes the wire management component 202 and a closed position that at least partially encloses the wire management component 202. While in the closed position, the curved surface 910 of the rear jack door 902*a* partially surrounds the collar 204 of the wire management component 202.

The second rear jack door 902*b* is similarly attached to hinge holes 1210 formed on the corners of the jack body 1202 opposite the corners on which the first rear jack door 902*a* is attached. The rear jack door 902*b* has a substantially similar design to that of rear jack door 902*a* but has a shape that allows portions of the second door 902*b* to overlap with corresponding portions of the first door 902*a* while both rear doors 902*a* and 902*b* are in the closed position. While both rear jack doors 902*a* and 902*b* are in the closed position, the doors 902*a* and 902*b* enclose the wire management component 202 while leaving the cable reception hole 208 exposed, with the curved surface 910 of the first jack door 902*a* surrounding a portion of the collar 204 and the curved surface 910 of the second jack door 902*b* surrounding the remaining portion of the collar 204. The two bumps 212*a* and 212*b* of the collar 204 reside within the notches 908 of the curved surfaces 910 of the two jack doors 902*a* and 902*b*, respectively. As described above in connection with FIG. 11, the drain wire 510 passes over a selected one of the two bumps 212*a* or 212*b* and is compressed between the bump 212*a*, 212*b* and the corresponding notch 908.

FIG. 16 is a perspective front view of the assembled wire management component 202 and jack body 1202 with the two rear jack doors 902*a* and 902*b* attached. The aperture 1212 on the front of the jack 1218 can be seen in this view.

Figure 17:
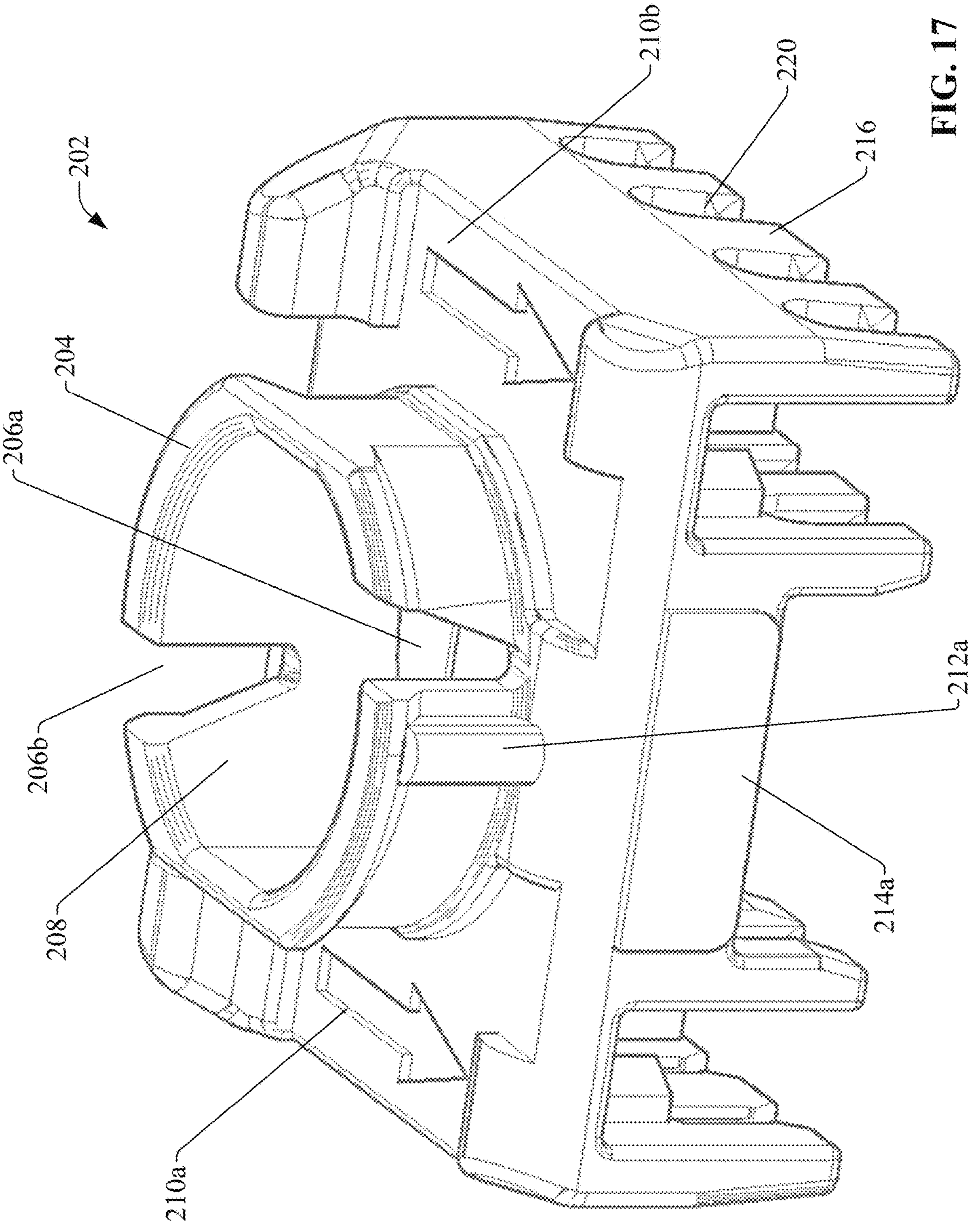
FIG. 17 is a perspective view of an example wire management component having a raised bump that is wider than that of the wire management component of FIG. 2.

The elongated bumps 212 formed on the collar 204 of the wire management component 202 can have substantially any shape or width. FIG. 17 is a perspective view of an example wire management component 202 having a substantially similar design to that depicted in FIG. 2, but whose elongated bumps 212*a*, 212*b* are wider than those of the example depicted in FIG. 2. Increasing the width of the bumps 212*a*, 212*b* can allow the wire management component 202 to accommodate a wider range of drain wire diameters.

The structural features of the jack assembly described herein provide a number of benefits in terms of data signal integrity, conductor management, and ease of assembly. The elongated bumps 212 formed on the collar 204 of the wire management component 202, together with the corresponding notch in the jack door 902, ensure a secure and robust grounding of the cable's drain wire 510 via the metallic jack door 902. The cable stop post 302 controls the installation depth of the jacketed portion of the cable 502 into the conductor organization area of the wire management component 202 as well as the location of the transition point between the cable jacket and the exposed cable conductors 508 relative to the retaining notches 220, which can result in neater conductor routing and easier termination of the conductors. The removal ridges 214 formed on the sides of the wire management component 202 can assist in applying a pull force when removing the wire management component 202 from the jack body 1202.

Figure 18:
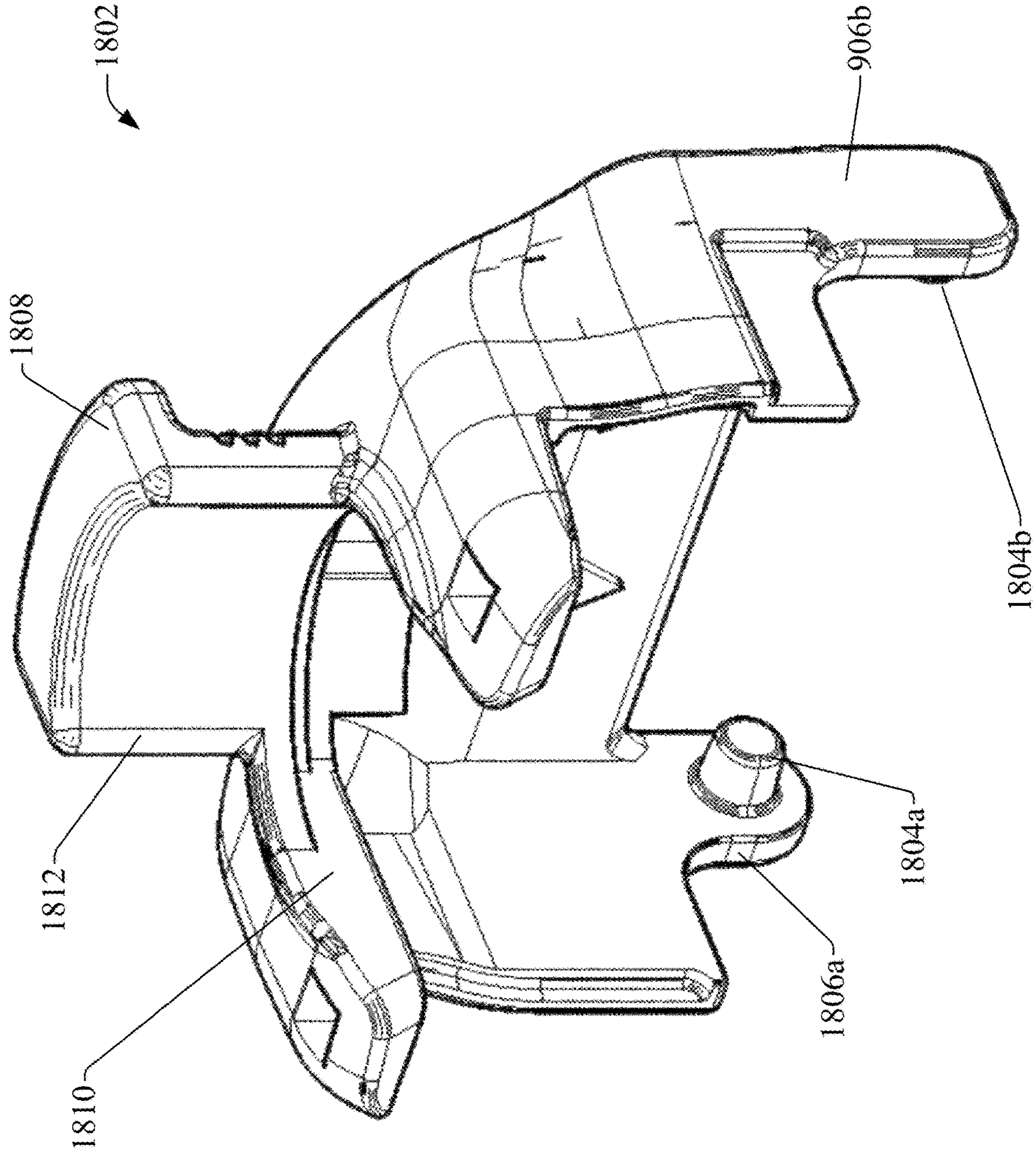
FIG. 18 is a perspective view of an example jack door that interfaces with a wire management component as part of a jack assembly, depicting the interior side of the jack door.
Figure 19:
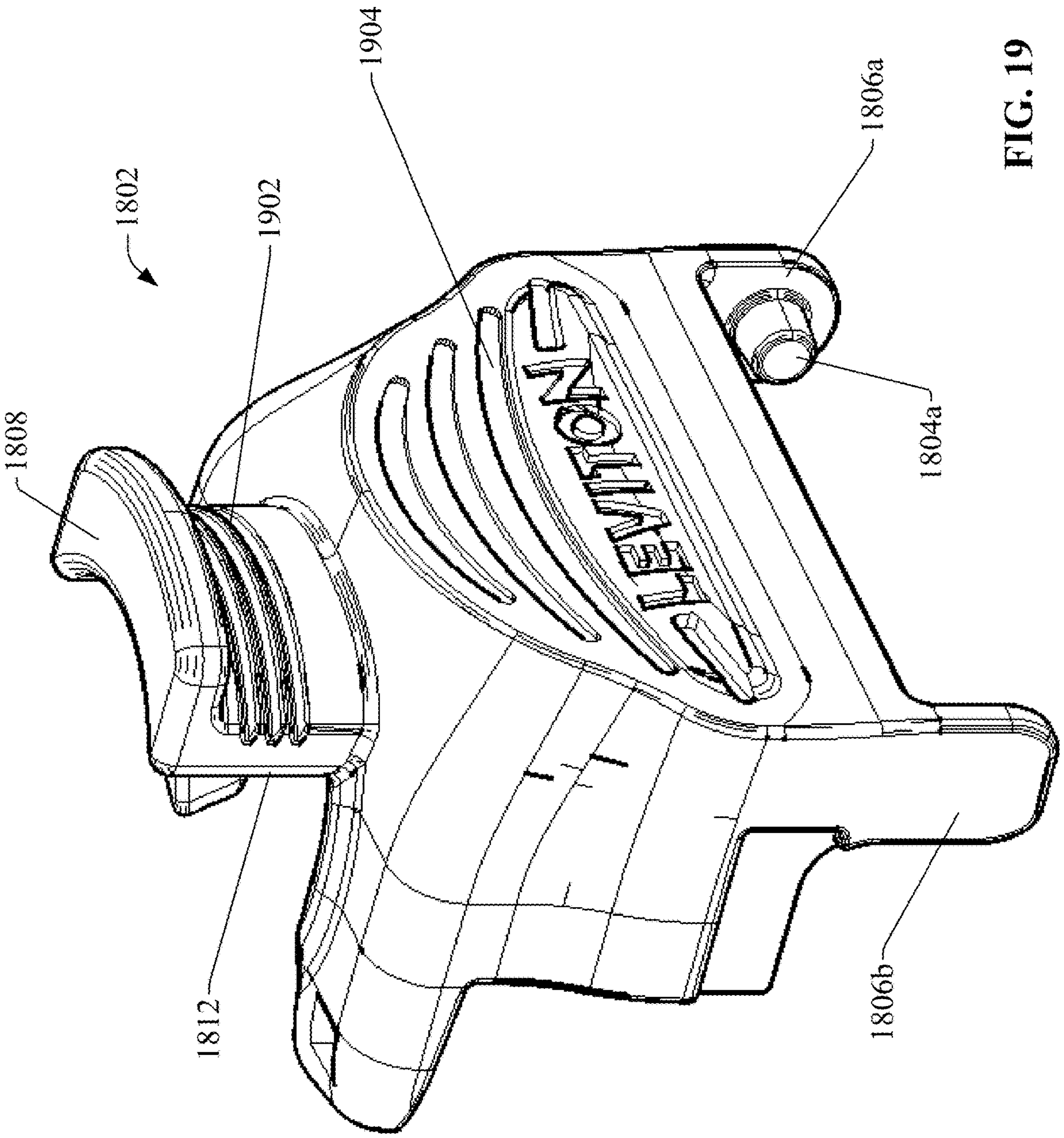
FIG. 19 is another perspective view of the jack door depicting the exterior side of the jack door.
Figure 20:
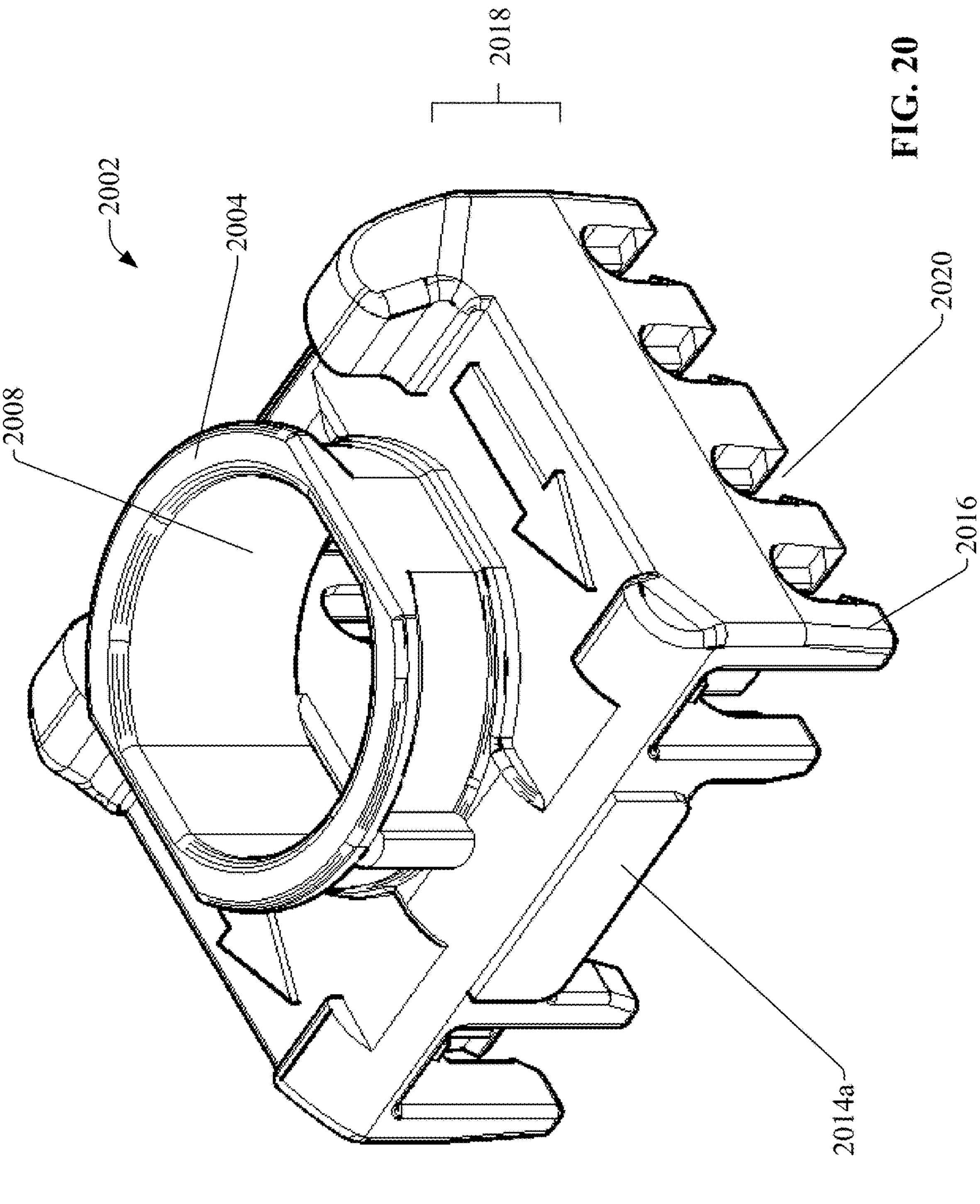
FIG. 20 is a perspective view of an example wire management component.

As an alternative to the design described above, in which an elongated bump 212 and corresponding notch 908 are used to securely ground the cable's drain wire 510 and shielding 506, other embodiments of the jack assembly can incorporate a flange on the metallic jack door around which the drain wire 510 can be wound. FIG. 18 is a perspective view of an example rear jack door 1802 that interfaces with a wire management component 2002 (see FIG. 20) as part of a jack assembly, depicting the interior side of the rear jack door 1802. FIG. 19 is another perspective view of the rear jack door 1802 depicting the exterior side of the rear jack door 1802. FIG. 20 is a perspective view of an example wire management component 2002 that can be used with rear jack door 1802.

As shown in FIGS. 18 and 19, rear jack door 1802 comprises two hinge arms 1806*a* and 1806*b* on which are formed respective two inward-facing dowels 1804*a* and 1804*b* (similar to rear jack door 902). Dowels 1804*a* and 1804*b* are configured to engage with corresponding holes (not shown in FIG. 18) that are part of the jack assembly to form a hinge. The resulting hinge is located below the wire management component 2002 when the jack components are assembled, such that the door 1802 pivots about the dowels 1804*a*, 1804*b* between an open position that exposes wire management component 2002 and a closed position that partially encloses the wire management component 2002.

As shown in FIG. 20, wire management component 2002 has a substantially similar structure to that of wire management component 202, comprising a solid body having a base section 2018 through which a cable reception hole 2008 is formed. In the illustrated example, the base section 2018 has a substantially rectangular shape. However, base sections 2018 of other shapes are also within the scope of one or more embodiments. Multiple conductor retaining towers 2016 are formed on the bottom side of the base section 2018, and a series of four retaining notches 2020 are formed along the bottom edge of each conductor retaining tower 2016 (similar to towers 216 and retaining notches 220 of wire management component 202). It is to be appreciated that embodiments of the wire management component 2002 are not limited to the wire management structure illustrated in FIG. 20, and that substantially any type or arrangement of conductor retaining mechanisms can be incorporated into the design of the wire management component 2002 without departing from the scope of one or more embodiments.

On the top side of the base section 2018 (that is, the side of the base section 2018 that will receive the data cable), the cable reception hole 2008 is surrounded by a collar 2004 that projects from the base section 2018 and traverses the perimeter of the cable reception hole 2008. Though not shown in FIG. 20, wire management component 2002 can also include a cable stop post—positioned similarly to cable stop post 302 of wire management component 202—that serves as a hard stop that impedes the leading edge of a cable's jacket. Also similar to wire management component 202, two raised removal ridges 2014*a* and 2014*b* are formed on two opposite sides, respectively, of the wire management component 2002. In the illustrated example, the removal ridges 2014*a* and 2014*b* are formed on the outward-facing surfaces of the two long sides of the base section 2018. These removal ridges 2014*a* and 2014*b* serve as grip points for a user's fingers when disconnecting the wire management component 2002 from its associated jack assembly.

In general, the structure of wire management component 2002 can be substantially similar to that of wire management component 202, except that the slots 206*a* and 206*b* formed on the collar 204 of wire management component 202 are omitted from the collar 2004 of wire management component 2002, since these slots 206*a*, 206*b* are not required for routing of a cable's drain wire 510 in this embodiment. The collar 2004 of wire management component 2002 can also omit the elongated bump 212 (although a bump is shown on the example wire management component 2002 depicted in FIG. 20). Similar to wire management component 202, wire management component 2002 can be mated with a jack body 1202 of a jack 1218 as described above in connection with FIGS. 12-14.

Returning to FIGS. 18 and 19, rear jack door 1802 comprises a curved surface 1810 that partially surrounds the collar 2004 of the wire management component 2002 while the rear jack door 1802 is in the closed position (similar to rear jack door 902). This curved surface 1810 may exclude the notch 908 that is formed on curved surface 910 of jack door 902, since the notch 908 and elongated bump 212 are not used to ground the drain wire 510 and shielding 506 in this embodiment. In contrast to rear jack door 902, a curved flange 1812 is formed along the edge or perimeter of the curved surface 1810 (or otherwise formed adjacent to or near the edge of the curved surface 1810) and protrudes from the outer surface of the rear jack door 1802. In the illustrated example, the curved flange 1812 extends partially along the perimeter of the curved surface 1810 and is substantially centered along the arc of the curved surface 1810. However, the curved flange 1812 may fully traverse the arc of the curved surface 1810 without departing from the scope of one or more embodiments. A lip 1808 is formed along the top edge of the curved flange 1812, extending toward the exterior-facing side of the arch of the curved flange 1812. As can be seen in FIG. 19, a series of parallel grooves 1902 are formed on the exterior-facing side of the curved flange 1812, extending substantially parallel with the top or bottom edges of the curved flange 1812. The flange 1812 is made of the same metallic or otherwise electrically conductive material as the rear jack door 1802.

Figure 21:
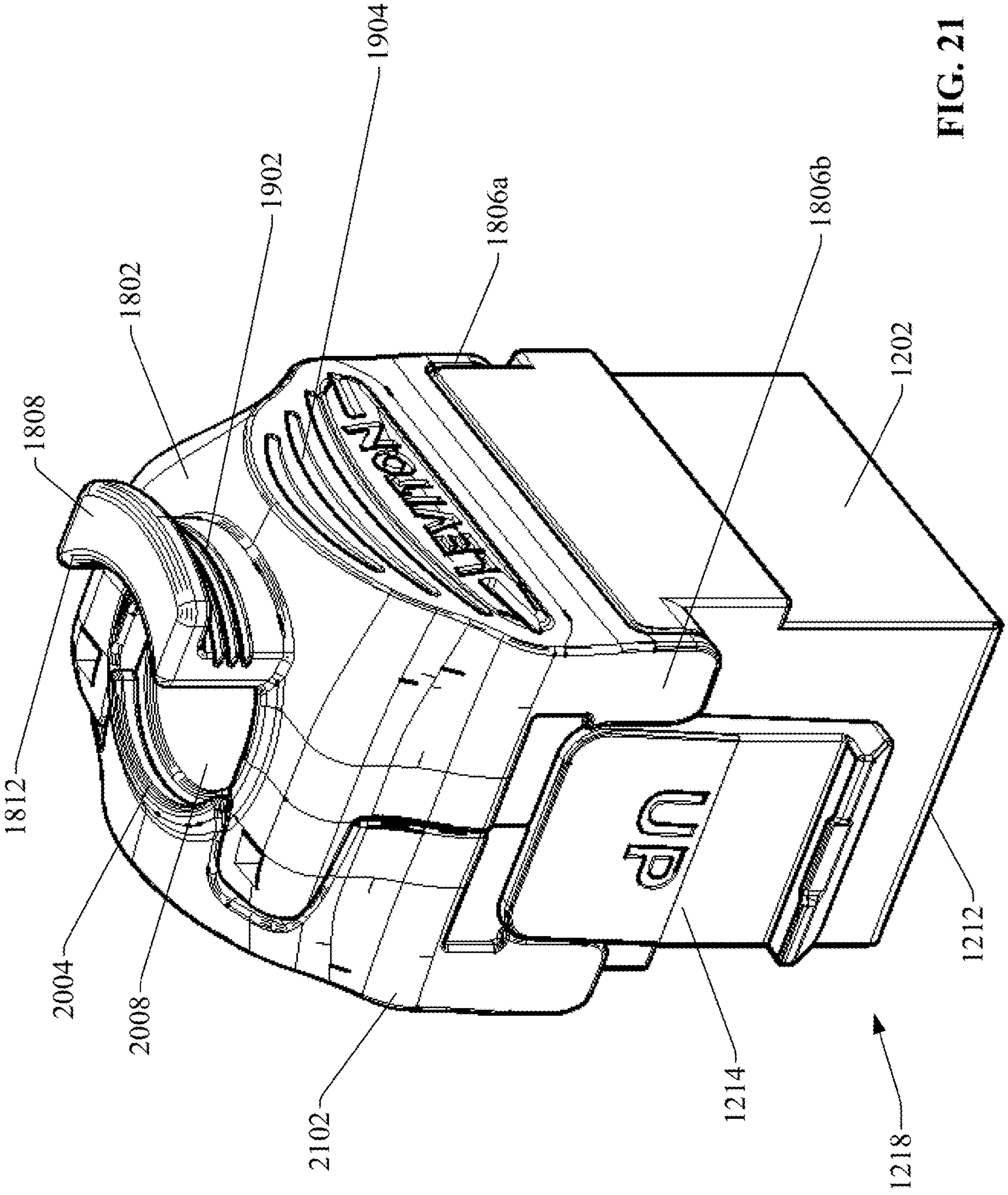
FIG. 21 is a perspective rear view of an assembled wire management component and jack body with two rear jack doors attached, yielding a jack assembly.
Figure 22:
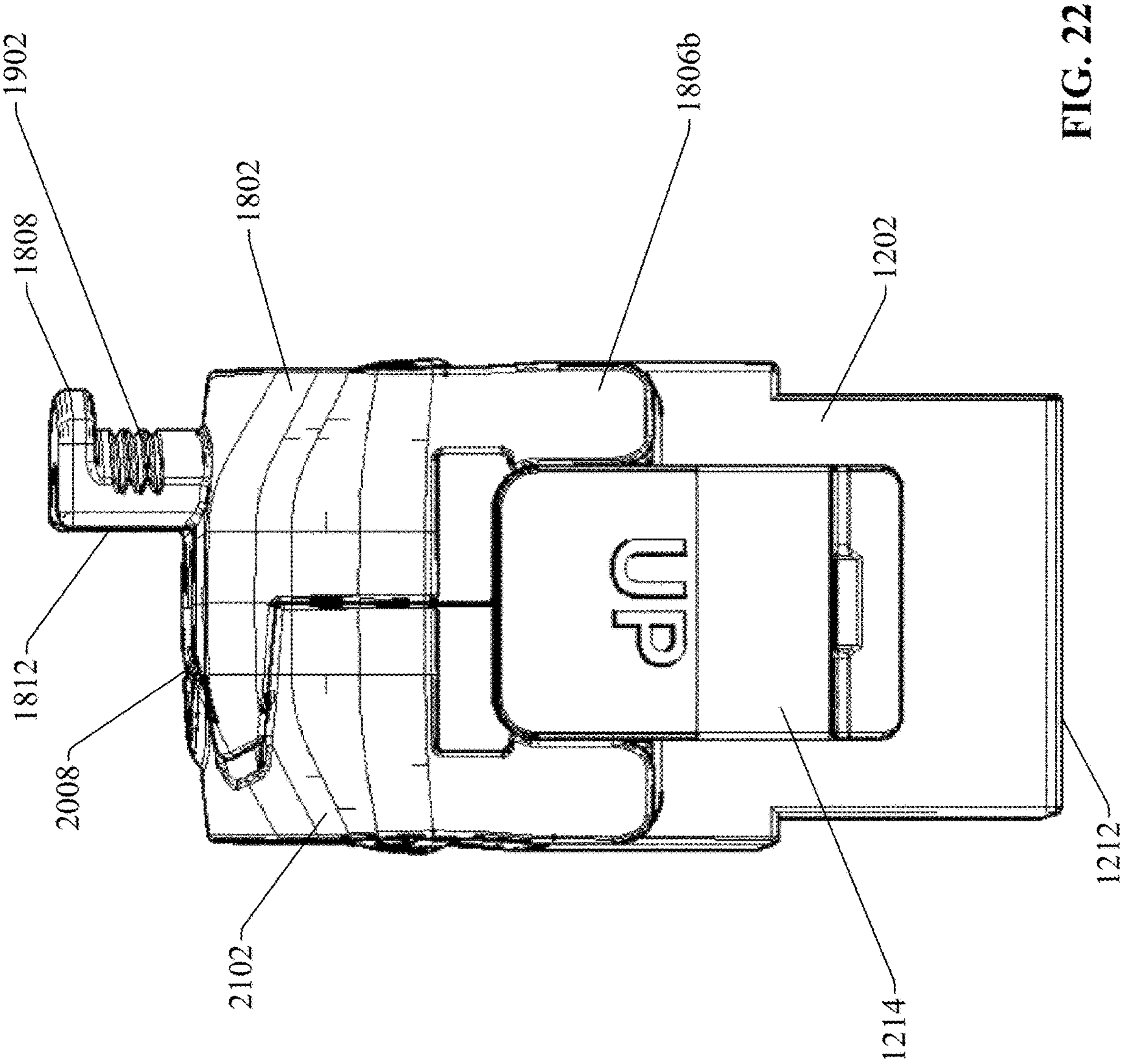
FIG. 22 is a side view of the jack assembly of FIG. 21.

FIG. 21 is a perspective rear view of the assembled wire management component 2002 and jack body 1202 with two rear jack doors 1802 and 2102 attached, yielding a jack assembly. FIG. 22 is a side view of this jack assembly. Rear jack door 2102 can have a design similar to that of rear jack door 902a illustrated in FIG. 15. In the example illustrated in FIG. 21, rear jack door 2102 does not include a flange having a similar design to curved flange 1812 on the opposing rear jack door 1802. However, in some embodiments a flange 1812 may be included on both rear jack doors 1802 and 2102.

When attached to the jack body 1202, the rear jack doors 1802 and 2102 can pivot about their corresponding hinge holes 1210*a*, 1210*b* (see FIGS. 12-14) between an open position that exposes the wire management component 2002 and a closed position that at least partially encloses the wire management component 2002. While in the closed position, the curved surface 1810 of the rear jack door 1802, as well as a corresponding curved surface on rear jack door 2102, each partially surrounds the collar 2004 of the wire management component 2002. Rear jack door 2102 has a shape that allows portions of the rear jack door 1802 to overlap with corresponding portions of the rear jack door 2102 while both rear doors 1802 and 2102 are in the closed position. While both rear jack doors 1802 and 2102 are in the closed position, the doors 1802 and 2102 enclose the wire management component 2002 while leaving the cable reception hole 2008 exposed, with the curved surface 1810 of rear jack door 1802 surrounding a portion of the collar 2004 and the corresponding curved surface of the other rear jack door 2102 surrounding the remaining portion of the collar 2004. Traction grooves 1904 can be formed on the outer surfaces of both rear jack doors 1802 and 2102 such that, when the rear jack doors 1802, 2102 and wire management component 2002 are assembled, sets of traction grooves 1904 reside on respective opposite sides of the resulting jack assembly. These traction grooves 1904 provide traction for a user's fingers when installing or removing the jack assembly.

Figure 23:
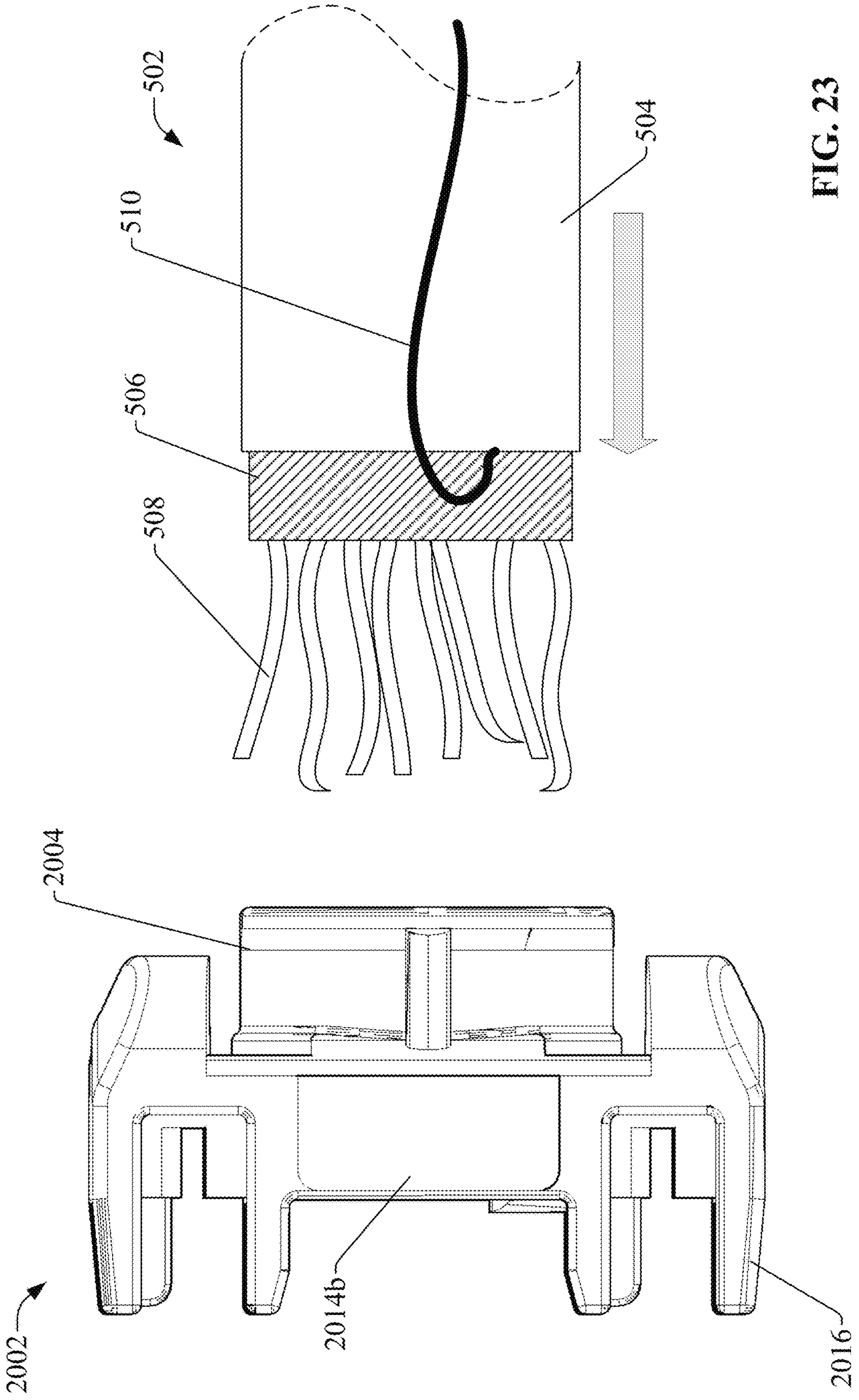
FIG. 23 is a side view of a wire management component with a category cable aligned for insertion through the cable reception hole of the wire management component.

Rather than establishing a grounding connection between the cable's drain wire 510 and the rear jack door 902 internally to the jack assembly using the elongated bump 212 and notch 908, as in the example illustrated in FIG. 11, the embodiment illustrated in FIGS. 18-22 allows the grounding connection between the drain wire 510 (and thus the cable shielding 506) and the rear jack door 1802 to be established externally to the jack assembly by winding the drain wire 510 around the flange 1812. FIG. 23 is a side view of the wire management component 2002 with a category cable 502 (e.g., a shielded twisted pair cable) aligned for insertion through the cable reception hole 2008 of wire management component 2002. In this example, rather than routing the cable's drain wire 510 through the slot 206 and around the collar 204 of the wire management component 202, as shown in FIGS. 5-8, the drain wire 510 is folded back along the jacket 504 of the cable 502 prior to insertion into the cable reception hole 2008 of wire management component 2002. When the rear jack doors 1802 and 2102 are added to the wire management component 2002 to complete the jack assembly, folding the drain wire 510 back along the jacket 504 in this manner allows the drain wire 510 to exit the assembly and to be wound around the flange 1812. The insulated electrical conductors 508 of the cable 502 can be installed on the retaining notches 2020 in a manner similar to that described above in connection with FIGS. 5-7.

Figure 24:
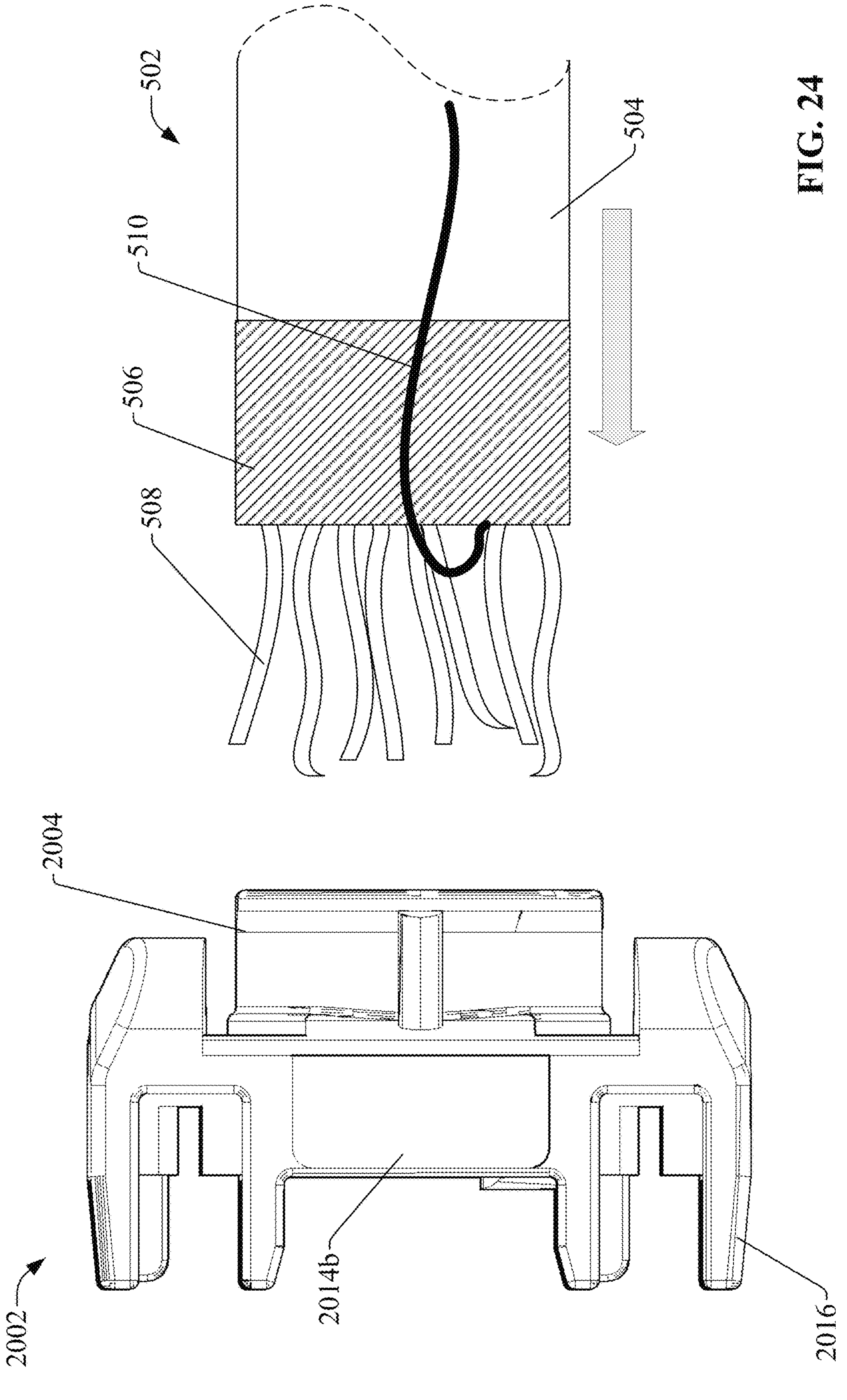
FIG. 24 is another side view of the wire management component with the category cable aligned for insertion in which a portion of the cable's shielding has also been folded back along the cable's jacket prior to insertion of the cable.

FIG. 24 is another side view of the wire management component 2002 with the category cable 502 aligned for insertion through the cable reception hole 2008 of wire management component 2002, in which a portion of the cable's shielding 506 has also been folded back along the jacket 504 prior to insertion of the cable 502. If desired, the exposed portion of the cable's shielding 506 can be folded back along the cable jacket 504 together with the drain wire 510 prior to installation of the cable 502 into the wire management component 2002. When the jack assembly is fully assembled, the resulting contact between the shielding 506 and the interior surface of the flange 1812 yields a secondary ground contact point that supplements the contact between the drain wire 510 and the flange 1812.

Figure 25:
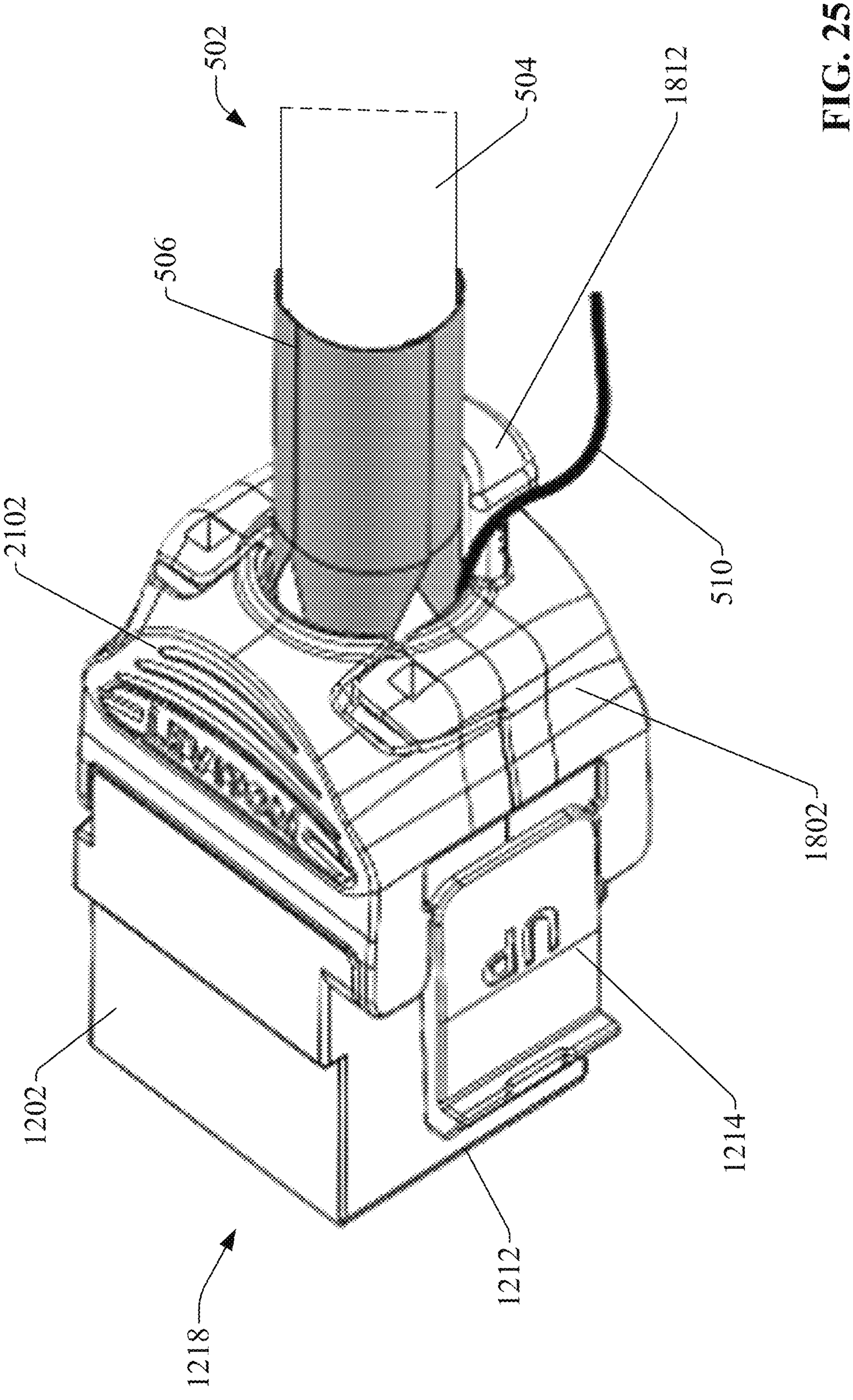
FIG. 25 is a view of the rear side of a jack assembly after a cable has been terminated on the assembly's wire management component, and a jack body and two rear jack doors have been attached.

FIG. 25 is a view of the rear side of the jack assembly after the cable 502 has been terminated on the wire management component 2002, and the jack body 1202 and two rear jack doors 1802 and 2102 have been attached (as shown in FIGS. 21 and 22). As shown in this figure, folding the drain wire 510 backward along the cable 502 allows the drain wire 510 to exit the jack assembly via the cable reception hole 2008. In the illustrated example, the exposed portion of the cable's shielding 506 has also been folded back along the outer surface of the cable jacket 504, and thus makes contact with the curved inward-facing surface of the flange 1812. This establishes a grounding connection between the cable shielding 506 and the metallic surface of the rear jack door 1802 via the flange 1812.

Figure 26:
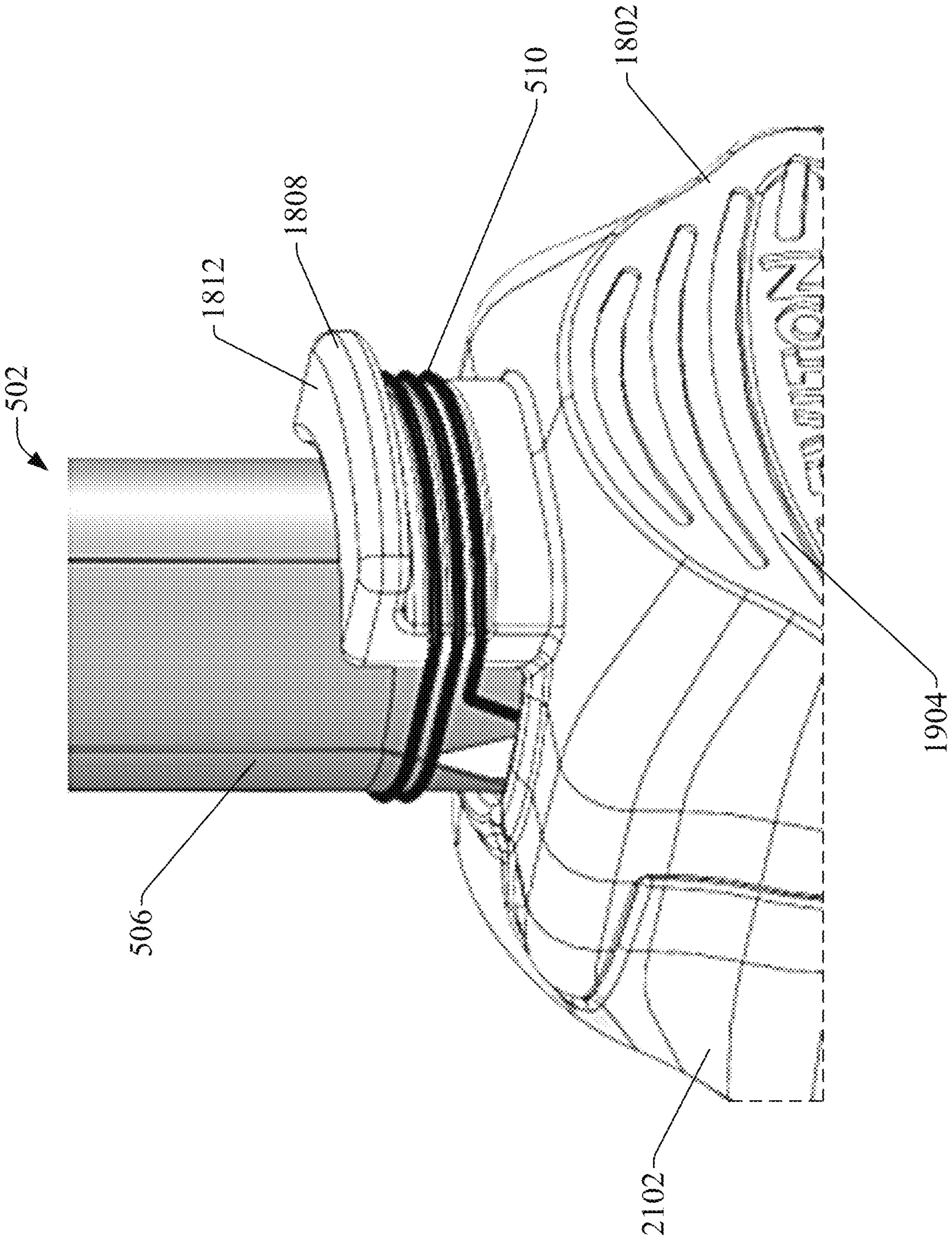
FIG. 26 is a view of the rear side of a jack assembly illustrating a grounding connection between a drain wire, cable shielding, and the flange of the jack assembly.
Figure 27:
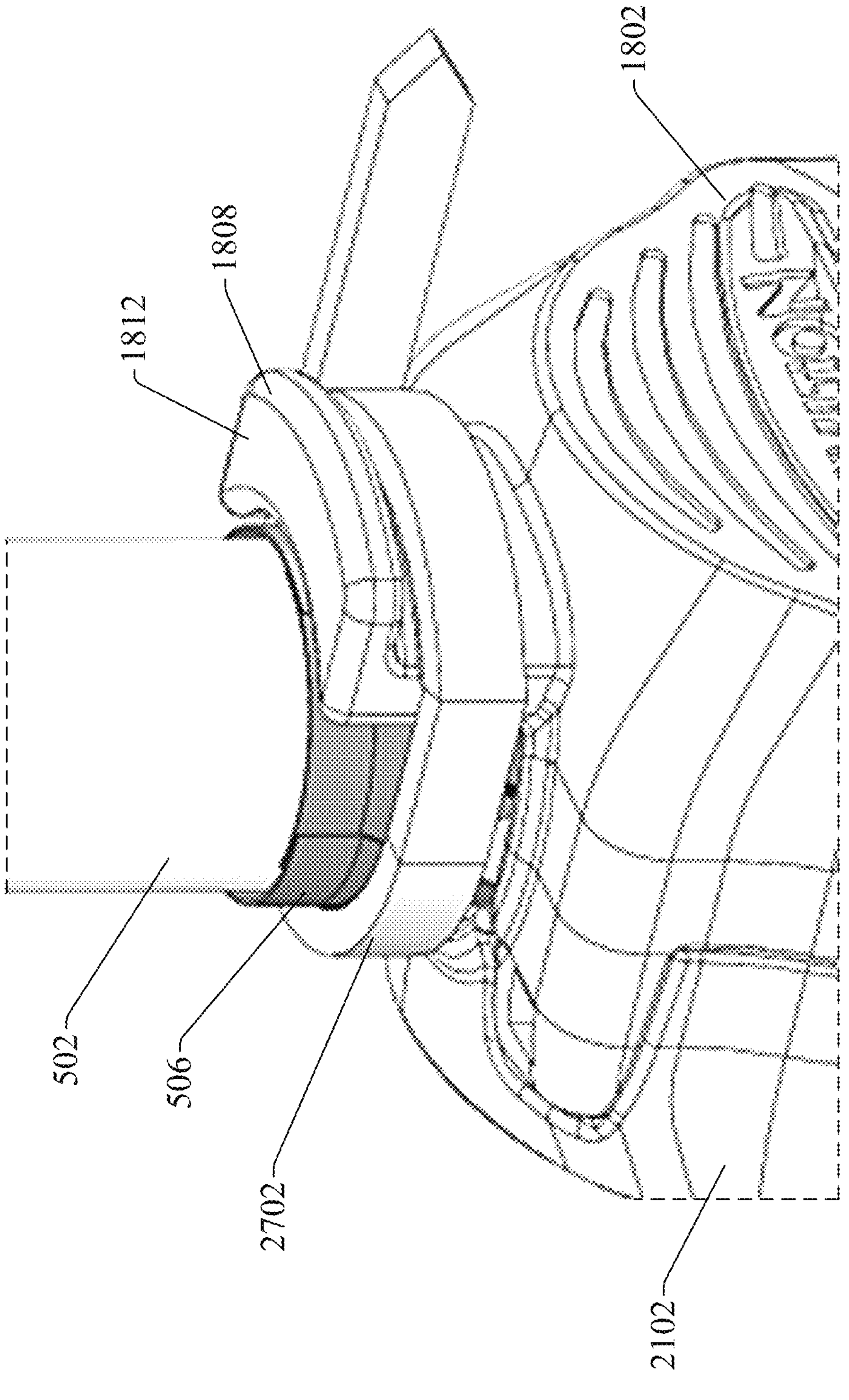
FIG. 27 is another view of the rear side of the jack assembly in which a wire tie has been wrapped around the flange and the cable to hold the windings of the drain wire in place on the flange.

Additionally, since the excess length of drain wire 510 resides outside the jack assembly, this external portion of the drain wire 510 can be wound around the flange 1812, thereby establishing another grounding connection between the drain wire 510 and the metallic surface of the rear jack door 1802. FIG. 26 is a view of the rear side of the jack assembly illustrating this grounding connection. Windings of the drain wire 510 can reside in the parallel grooves 1902 formed on the external-facing surface of the flange 1812, thereby yielding a robust electrical connection between the drain wire 510 and the flange 1812 that supplements the electrical connection between the flange 1812 and the cable shielding 506. The lip 1808 that extends from the top edge of the flange 1812 can prevent the windings of the drain wire 510 from sliding off of the flange 1812. The windings of the drain wire 510 can be secured to the flange 1812 using additional fastening mechanisms if desired. FIG. 27 is another view of the rear side of the jack assembly in which a wire tie 2702 has been wrapped around the flange 1812 and the cable 502 to hold the windings of the drain wire 510 in place on the flange 1812.

Figure 28:
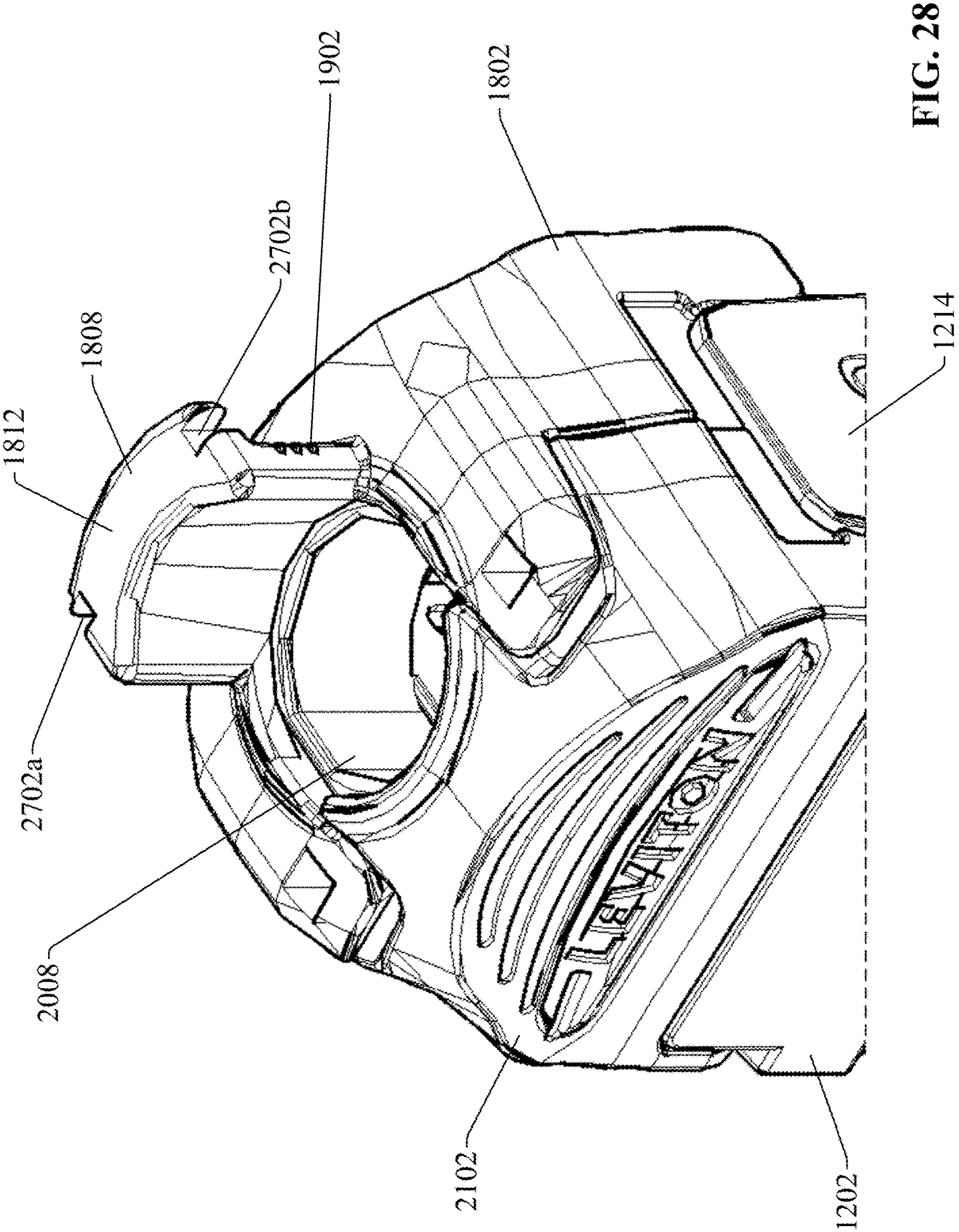
FIG. 28 is a perspective rear view of an embodiment of the jack assembly in which retaining notches are formed on the lip of the flange.

FIG. 28 is a perspective rear view of another embodiment of the jack assembly in which retaining notches 2702*a* and 2702*b* are formed on the lip 1808 of the flange 1812 to assist in retaining the drain wire 510 on the flange 1812 after winding. In the illustrated example, the lip 1808 comprises two retaining notches 2702*a* and 2702*b* formed on respective ends of the lip 1808 and facing in opposite directions. However, any number of notches 2702 may be formed on the lip 1808, and at any location along the lip 1808, without departing from the scope of one or more embodiments.

Figure 29:
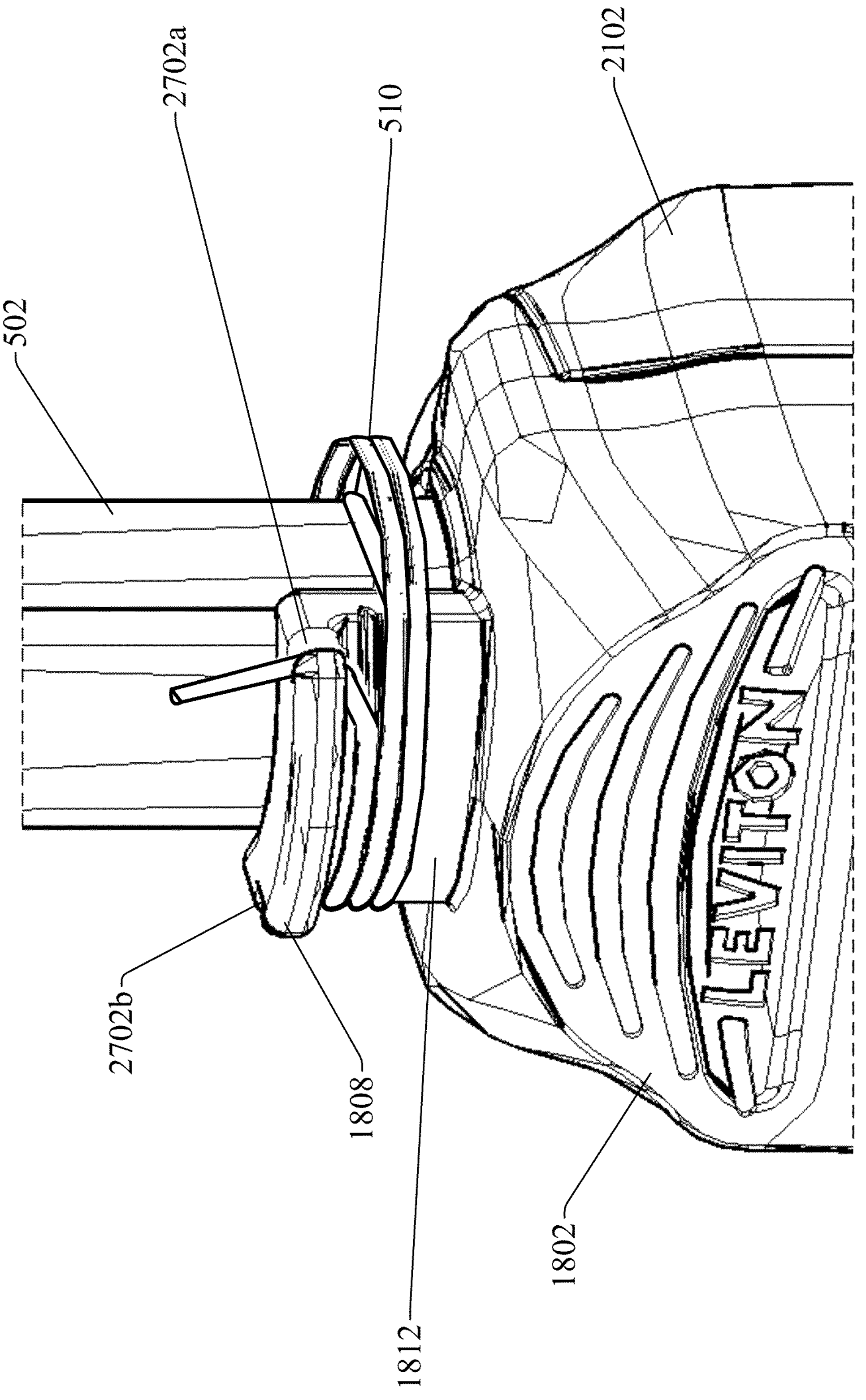
FIG. 29 is a perspective rear view of the jack assembly in which retaining notches are formed in the lip of the flange, and a cable's drain wire is wound around the flange and routed through one of the notches.

FIG. 29 is another perspective rear view of the jack assembly in which the cable's drain wire 510 has been wound around the flange 1812 and cable 502. After the drain wire 510 has been wound around the flange 1812 and cable 502, the excess unwound portion of the drain wire 510 can be routed through a retaining notch 2702*a* or 2702*b*, which serves to retain the drain wire 510 on the flange 1812. The redirection of the drain wire 510 through the retaining notch 2702*a* or 2702*b*, and the retention of the wire 510 by the notch 2702*a* or 2702*b*, resists the wire's natural propensity to unwind from the flange 1812, allowing the wire tie 2702 to be installed more easily. If desired, the excess portion of the drain wire 510 can be wound around the lip 1808 through the two notches 2702*a* and 2702*b*.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A cable jack assembly, comprising:
- a wire management component configured to retain a data cable and to electrically interface conductors of the data cable with conductive contacts of a jack, the wire management component comprising:
  - a base section through which a cable reception hole is formed; and
  - a collar that traverses a perimeter of the cable reception hole on a side of the base section that receives the data cable; and
- a jack door comprising:
  - hinge arms configured to connect to a jack body of the jack, wherein the jack door is configured to pivot about the hinge arms between an open position and a closed position,
  - a curved surface that surrounds at least a portion the collar while the jack door is in the closed position, and
  - a flange formed along a perimeter of the curved surface that protrudes from an outer surface of the jack door, wherein
  - the jack door comprises a conductive material, and
  - contacting a drain wire of the data cable to the flange establishes an electrical connection between the drain wire and the jack door.

2. The cable jack assembly of claim 1, wherein parallel grooves are formed along an outer surface of the flange.

3. The cable jack assembly of claim 1, wherein a lip is formed along a top edge of the flange.

4. The cable jack assembly of claim 1, wherein traction grooves are formed on an exterior-facing surface of the jack door.

5. The cable jack assembly of claim 1, wherein
- the side of the base section that receives the data cable is a first side,
- the cable jack assembly further comprises a cable stop post formed on a second side of the base section opposite the first side, and
- the cable stop post is located a distance from an exit of the cable reception hole and is configured to impede insertion of a jacketed portion of the data cable through the cable reception hole beyond the distance from the exit of the cable reception hole.

6. The cable jack assembly of claim 1, wherein
- the side of the base section that receives the data cable is a first side,
- the cable jack assembly further comprises retaining towers formed on a second side of the base section that is opposite the first side, and
- the retaining towers comprise retaining notches configured to retain the conductors of the data cable.

7. The cable jack assembly of claim 6, wherein
- the wire management component is configured to connect to the jack body of the jack, and
- connection of the wire management component to the jack body while the conductors of the data cable are held by the retaining notches causes the conductors to electrically interface with the conductive contacts of the jack.

8. The cable jack assembly of claim 1, wherein the wire management component further comprises
- a first raised removal ridge formed on a first side of the base section adjacent to the side of the base section that receives the data cable, and
- a second raised removal ridge formed on a second side of the base section adjacent to the side of the base section that receives the data cable and opposite the first side.

9. The cable jack assembly of claim 1, wherein
- the wire management component is configured to connect to a rear side of the jack body, and
- an aperture of the jack is formed on a front side of the jack body.

10. A system, comprising:
- a wire management component comprising a base section, a cable reception hole formed through the base section, and a collar formed around a perimeter of the cable reception hole, wherein the wire management component is configured to connect to a rear side of a jack body of a jack; and
- a jack door comprising a conductive material and configured to attach hingedly to the jack body and, while attached to the jack body, pivot between an open position and a closed position, wherein the jack door comprises:
- a curved surface that at least partially surrounds the collar while the jack door is in the close position, and
- a flange that extends from an exterior-facing surface of the jack door adjacent to an edge of the curved surface, wherein the flange establishes an electrical connection between the jack door and a drain wire of a data cable while the drain wire contacts the flange.

11. The system of claim 10, wherein an outward-facing surface of the flange comprises parallel grooves configured to retain windings of the drain wire.

12. The system of claim 10, wherein the flange comprises a lip that is formed along a top edge of the flange.

13. The system of claim 10, wherein an outer surface of the jack door comprises traction grooves.

14. The system of claim 10, wherein the collar is formed around the perimeter of the cable reception hole on a first side of the base section, the wire management further comprises conductor retaining structures on a second side of the base section opposite the first side, and a cable stop post is formed on the second side of the base section and is configured to impede a jacket of the data cable when a leading edge of the jacket abuts against the cable stop post while the data cable is being inserted through the cable reception hole via the first side of the base section.

15. The system of claim 10, wherein the wire management component further comprises a first raised removal ridge and a second raised removal ridge formed on respective opposite sides of the base section.

16. The system of claim 10, further comprising retaining towers comprising retaining notches configured to retain conductors of the data cable.

17. A cable jack assembly, comprising:

a wire management component comprising a base section through which a cable reception hole is formed, wherein a collar is formed around the cable reception hole; and a jack door comprising a conductive material and configured to at least partially enclose the wire management component while in a closed position, wherein the jack door comprises:

a curved surface that at least partially surrounds the collar while the jack door is in the closed position, and a flange formed along a perimeter of the curved surface that protrudes from an outer surface of the jack door, wherein the flange establishes an electrical connection between the jack door and a drain wire of a data cable while the drain wire contacts the flange.

18. The cable jack assembly of claim 17, wherein parallel grooves are formed along an outer surface of the flange.

19. The cable jack assembly of claim 17, wherein a lip is formed along a top edge of the flange.

20. The cable jack assembly of claim 17, further comprising a cable stop post formed on the base section.

* * * * *